Dec. 2, 1969 A. M. SQUIRES 3,481,834
PROCESS AND APPARATUS FOR DESULFURIZING FUELS
Filed Aug. 21, 1968 4 Sheets-Sheet 1

INVENTOR
ARTHUR M. SQUIRES

INVENTOR
ARTHUR M. SQUIRES

United States Patent Office 3,481,834
Patented Dec. 2, 1969

3,481,834
PROCESS AND APPARATUS FOR DESULFURIZING FUELS
Arthur M. Squires, 245 W. 104th St., New York, N.Y. 10025
Continuation-in-part of applications Ser. No. 556,434, June 9, 1966, Ser. No. 561,551, June 29, 1966, and Ser. No. 607,231, Jan. 4, 1967. This application Aug. 21, 1968, Ser. No. 754,226
Int. Cl. C10b 49/10, 31/02
U.S. Cl. 201—17     21 Claims

ABSTRACT OF THE DISCLOSURE

Sulfurous hydrocarbonaceous fuels, such as bituminous coals and residual oils, are converted into fuel products low in sulfur, one product comprising a coke in form of pellets. The fuel is charged to a lower zone of a fluidized bed, this zone comprising the coke pellets, wherein the fuel is carbonized or cracked to form gaseous products and a fresh coke accreting upon the pellets. The gaseous products along with hydrogen fluidize a superposed, contiguous, upper zone of the fluidized bed, the upper zone comprising a commingling of the coke pellets and a solid of smaller size containing a substance avid for sulfur from hydrogen sulfide, such as calcium oxide. The upper zone is fluidized at lower velocity than the lower zone, and the velocity of the lower zone is sufficient to prevent the smaller solid from penerating deeply into the zone. Means are provided to ensure that, soon after a layer of fresh coke is formed on a given pellet, this pellet finds itself within the upper zone, whereupon the fresh coke is desulfurized through the cooperative action of the hydrogen and the smaller solid. Gaseous products are also desulfurized while passing through the upper zone. Fuel gas and coke, each low in sulfur, are withdrawn from the fluidized bed.

BACKGROUND OF THE INVENTION

This application is a continuation-in-part of my copending applications Ser. No. 556,434, filed June 9, 1966 and allowed May 28, 1968, now U.S. Patent 3,402,998, Ser. No. 561,551, filed June 29, 1966, now U.S. Patent 3,437,561 and Ser. No. 607,231, filed Jan. 4, 1967, now U.S. Patent 3,436,909.

There is a long history of attempts to employ hydrogen to reduce the sulfur content of chars and cokes derived from coals and heavy residual oils. A. R. Powell of the U.S. Bureau of Mines [Journal of Industrial and Engineering Chemistry, vol. 12 (1920), pages 1077–1081] reported only a limited removal of sulfur from metallurgical coke by action of hydrogen at high temperature. He later published data [Journal of the American Chemical Society, vol. 45 (1923), pages 1–15] showing that presence of even a minor quantity of hydrogen sulfide in hydrogen inhibits the further evolution of hydrogen sulfide by attack of the hydrogen upon coke. The reacting system behaves as if there were a chemical equilibrium between coke, hydrogen, and hydrogen sulfide. The content of hydrogen sulfide in gas at the apparent equilibrium appears to be a function of the sulfur content of the coke, and is smaller at lower sulfur levels in the coke. J. D. Batchelor, E. Gorin, and C. W. Zielke of Consolidation Coal Company [Industrial and Engineering Chemistry, vol. 52 (1960), pages 161–168] showed that the ratio of $H_2S$ to $H_2$ in a gas must not be greater than 1 to about 350 for the gas at 1,600° F. to be able to reduce the sulfur content of a char of bituminous coal to a low level. The critical ratio at 1,350° F. is 1 to about 800. The determining factor in establishing these ratios is the removal of sulfur from FeS arising from decomposition of pyrites in the coal. If a coal contains little pyrites—or if pyrites are removed in advance of carbonization—a char derived from the coal may be substantially desulfurized at an $H_2S$-to-$H_2$ ratio of 1 to about 100 to 200.

J. K. Ghosh and R. E. Brewer of the U.S. Bureau of Mines [Industrial and Engineering Chemistry, vol. 42 (1950), pages 1550–1558] studied the carbonization of coal in an atmosphere of ammonia, the ammonia cracking to yield hydrogen. These authors showed that addition of sodium carbonate or lime to a high-sulfur coal resulted in a coke of appreciably lower sulfur content, after soluble sulfur compounds were leached from the coke. The effect of the additions was to keep the $H_2S$ content of the hydrogen below a level at which the removal of sulfur would be inhibited.

A patent of the Consolidation Coal Company [U.S. Patent 2,824,047 (Feb. 18, 1958)] proposed that a char or coke be desulfurized by hydrogen, preferably at 1 to 6 atmospheres, in presence of an "acceptor" compound for hydrogen sulfide, capable of maintaining a low ratio of $H_2S$ to $H_2$ in the operation. Various substances containing lime were proposed for the acceptor including calcined dolomite. Another preferred acceptor was manganous oxide. The sulfides formed during the operation were to be regenerated by combustion with air. In the case of CaS, the combustion was practiced with a slight deficiency of air in order to expel sulfur as $SO_2$. A series of patents [U.S. Patents 2,927,063 (Mar. 1, 1960), 2,950,229, 2,950,230, 2,950,231 (Aug. 23, 1960), and 3,101,303 (Aug. 20, 1963)] dealt with forms of the manganous oxide acceptor and problems in its regeneration. The char and the acceptor were to be different in physical size so that they might be separated. If the operation were conducted in a fluidized bed, a char of small particle size and an acceptor of large size were preferred. If the operation were conducted in a rotary kiln or moving bed, a briquetted char and a very fine acceptor were preferred.

The FMC Corporation has reported to the U.S. Office of Coal Research (OCR) on application of Consolidation Coal Company's proposals to desulfurizing a char produced by carbonizing a bituminous coal in a series of fluidized beds operating at progressively higher temperatures ["Char Oil Energy Development," OCR Contract No. 14–01–0001–235, January 1967, available from OCR and on deposit at many libraries]. Data were presented confirming the low levels of $H_2S$ in $H_2$ which inhibit the removal of sulfur from char. Kinetic data were given revealing that the reaction proceeds in two stages: an initial rapid reaction followed by a much slower reaction stage governed by the diffusion of $H_2S$ from within micropores in the interior of the char structure. Progress of FMC Corporation in this development was reported on page 72 of Engineering and Mining Journal for May 1968.

Consolidation Coal Company has reported to the OCR on engineering embodiments of schemes using calcined dolomite to accept sulfur from a char undergoing treatment by hydrogen ["Low Sulfur Boiler Fuel Using the Consol $CO_2$ Acceptor Process: A Feasibility Study," by F. W. Theodore, November 1967, OCR Contract 14–01–0001–415].

The chars of the aforementioned proposals by Consolidation Coal Co. and FMC Corporation were each produced in an operation separate from the step in which the char was desulfurized by hydrogen. In practice, a char conducted to this step had been "aged" at high temperature of many minutes, probably for scores of minutes, before it reached the step.

U.S. Patent 3,130,133 (April 21, 1964) discloses that petroleum coke may be substantially desulfurized by hydrogen provided the coke is ground to a fineness smaller than 200-mesh.

My aforementioned application Ser. No. 556,434 discloses that CaS can be converted to CaCO₃ and H₂S by treatment with steam and carbon dioxide at elevated pressure and at a temperature below about 1,300° F. The solid which results from the treatment is suitable for re-use in a fuel-desulfurization step. The treatment has utility in regenerating the lime-containing acceptors of the aforementioned U.S. Patent 2,824,047, and was employed in one of the embodiments of the aforementioned report to OCR by F. W. Theodore.

My aforementioned application Ser. No. 561,551 discloses a technique for hydrocarbonizing coal in an agglomerating fluidized bed, to form pellets of coke and a gas rich in methane.

SUMMARY OF THE INVENTION

The invention relates to an improved method and apparatus for converting a sulfurous hydrocarbonaceous fuel, such as bituminous coal and residual oil, into fuel products low in sulfur, one of the products comprising pellets of coke.

An object of the invention is to provide an improved economic method whereby sulfur may be recovered in elemental form from a sulfurous fuel, while supplying fuel products low in sulfur for combustions which produce effluents unobjectionable from the standpoint of air pollution.

Another object is to provide processes yielding a coke low in sulfur, starting from coal, including bituminous and subbituminous coals and lignites, many of which are not ordinarily considered to be coking coals, or from fluid hydrocarbonaceous fuel such as residual oil, bitumen, pitch, tar, kerogen, and the like.

Another object is to provide processes yielding gas of high calorific value, suitable for transmission via pipeline, from coal or oil.

Another object is to provide processes yielding an aromatic light tar low in sulfur from coal or oil.

Another object is to provide systems whereby coal or oil may be burned to generate electricity at outstandingly good thermal efficiency, without emission of objectionable effluents and with recovery of elemental sulfur.

More specifically, the invention relates to an improved method and apparatus for the absorbing of sulfur from a fuel by a solid acceptor in the presence of hydrogen, the acceptor acting to keep the ratio of H₂S to H₂ below the critical values previously discussed. An advantage of the improved procedure over earlier proposals is that the raw sulfurous fuel is carbonized or cracked and the products are desulfurized in a single unitary operation. Hydrogen from carbonization or cracking of the raw fuel is made available to desulfurize coke, the carbonization or cracking and the desulfurizing both being carried out in a single reaction vessel. Desulfurization is substantially simultaneous with carbonization or cracking. Practically speaking, no "aging" of the coke product occurs between its formation and its exposure to the desulfurizing conditions brought about by cooperation of acceptor and hydrogen. Desulfurization is more rapid, not only because the coke is fresh, but also because H₂S need not diffuse outward from within micropores deep inside a char or coke structure. The reaction volume space required for carbonization or cracking of the fuel and desulfurization of the products is outstandingly small by comparison with all prior proposals known to me.

According to the invention, there is provided method and apparatus useful for preparing sulfur from a sulfurous fuel while converting the fuel into products low in sulfur. A sulfurous hydrocarbonaceous fuel is charged to a first zone of a fluidized bed, this zone comprising pellets of coke at a temperature sufficient to cause carbonization or cracking of the fuel to produce fuel gases and a coke product adhering to and accreting upon the pellets. A solid containing a substance avid to receive sulfur from hydrogen sulfide is supplied to a second zone of the fluidized bed superposed on the first zone and contiguous therewith and receiving fluidizing gas therefrom. The second zone is fluidized at lower velocity, and the solid comprises particles of sizes smaller than the coke pellets. The rate of supply of the solid is such that the amount of the substance supplied is sufficient to absorb substantially all of the sulfur contained in the fuel. The first zone is fluidized at velocity high enough that the smaller solid is substantially prevented from sinking deep within this zone. A partial pressure of hydrogen is maintained in the second zone. The coke pellets and solid are commingled in the second zone, wherein the substance avid for sulfur absorbs sulfur from the fuel gases and from the coke product adhering to the pellets, means being provided for effecting a rapid interchange between coke pellets in the first and second zones. Fuel gas is withdrawn from the second zone, coke pellets are withdrawn from the fluidized bed, and a solid is withdrawn from the second zone containing a reaction product of the substance and hydrogen sulfide.

The solid withdrawn from the second zone is preferably one from which a valuable sulfur product, such as H₂S or SO₂, may be derived in a treatment regenerating the aforementioned solid containing a substance avid to receive sulfur, so that the operation may be cyclic with respect to this solid. The aforementioned U.S. Patent 2,824,047 cites the oxides of calcium, manganese, iron, lead, and copper as suitable substances avid for sulfur. A preferred substance is calcium oxide, to be discussed in detail hereinafter.

Both the coke pellets and the sulfur-avid solid should be present in a range of particle sizes, preferably a range such that substantially the largest particle in each solid is at least about five times larger than substantially the smallest particle in the solid. The largest particle of the sulfur-avid solid should preferably be less than one-half the diameter of the smallest of the coke pellets.

The preferred way to ensure that the second zone is fluidized at a lower velocity than the first zone is to provide a second zone larger in cross-sectional area than the first zone.

It is preferable to withdraw coke pellets from the bottom of the first zone, but a suitable procedure is to withdraw both coke pellets and the sulfur-avid solid from the second zone. The mixture of the two solids can be readily separated, on account of their differing sizes, either by elutriation or by screening. If too much of either of the solids have been withdrawn, the excess may be returned to the fluidized bed.

A preferred procedure for withdrawing fuel gas from the second zone is to allow the gas to fluidize a third zone of the fluidized bed, superposed on the second zone and contiguous therewith and generally larger in cross-sectional area, and to withdraw the gas from the third zone. By making the cross-sectional area of the third zone sufficiently large, the fluidizing velocity therein will be so low that coke pellets are substantially prevented from penetrating in large numbers and for large distances into the third zone. Relatively few coke pellets will appear in any solid which is entrained in gas withdrawn from the third zone, and relatively few coke pellets will be present next to the wall encompassing the third zone. A preferred procedure for withdrawing the sulfur-avid solid from the second zone is to withdraw the solid from the third zone, there being a free interchange of the solid between the second and third zones. The withdrawal may conveniently be made either from a point next to the wall or by allowing solid to be entrained in dilute-phase transport by the fuel gas leaving the third zone.

The fluidizing-gas velocity in the first zone should preferably be less than 10 times greater than the minimum fluidization velocity of the coke pellets. The ability to select a velocity whereby the lower elevations of the first zone are maintained substantially free of the sulfur-avid solid may be understood by considering the events which occur when a bed of particles is fluidized by a gas at ever higher velocities. As velocity is gradually increased, the density of the fluidized bed decreases, but the rate of decrease in density with increase in velocity is not marked. Ultimately, however, a critical velocity is abruptly reached at which the density of the bed drops sharply; the bed appears suddenly to "thin out." Unless the vessel containing the bed is extremely tall, the gas will convey most of the bed overhead and away from the vessel. This critical velocity may be termed the "dilute-phase transition velocity." An attempt to fluidize the particles at a higher velocity merely produces a dilute phase having a voidage usually well over 90 percent. If a small particle is injected into a gas-fluidized bed of relatively far larger particles, the smaller particle will tend to rise toward the top of the bed if its size and density are such that its dilute-phase transition velocity, in a bed comprising an aggregation of like smaller particles, is appreciably below the actual fluidizing velocity in the bed of larger particles. The largest particle of the sulfur-avid solid should be such that it would tend to rise toward the top of the fluidized bed of coke pellets comprising the first zone.

The sulfur-avid solid is preferably fluidized in the second zone at a fluidizing-gas velocity at least about 10 times greater than the minimum fluidization velocity of the solid. The dilute-phase transition velocity of the sulfur-avid solid is preferably not more than about 50 percent larger than the minimum fluidization velocity of the coke pellets taken altogether. The fluidization velocity in the second zone should be less than the dilute-phase transition velocity of the sulfur-avid solid, and should preferably be below the minimum fluidization velocity of the majority of the coke pellets, each pellet taken singly in a bed comprising an aggregation of like pellets.

The ability to effect a commingling of the coke pellets and the sulfur-avid solid in the second zone, while maintaining an interchange between coke pellets residing in the first and second zones, may be understood from the following observations. If a large particle is injected into a gas-fluidized bed of relatively far smaller particles, the larger particle will tend to sink toward the bottom of the bed if its size and density are such that its own minimum fluidization velocity, in a bed comprising an aggregation of like larger particles, is appreciably above the actual fluidization velocity of the bed of smaller particles (provided the larger particle does not have a density below the fluidized density of the smaller particles). By maintaining a sufficiently high velocity at the top of the first zone, one may promote a geysering of the coke pellets from the first zone into the second. Coke pellets introduced in this manner into the second zone gradually work their way downward and back into the first zone. Alternatively, one may advantageously provide a vertical open-ended pipe extending from approximately the upper elevation of the first zone to approximately the top elevation of the second zone. One can maintain a circulation of coke pellets upward through the pipe by injecting gas into its bottom. Coke pellets from the first zone would thereby be injected into the top of the second zone, from which elevation they would work their way downward and return to the first zone.

If a third zone is provided, as discussed hereinbefore, its mean cross-sectional area is preferably not less than about four times larger than the mean cross-sectional area of the first zone. The smallest coke pellet should be of a size such that it tends to sink toward the bottom of the fluidized bed of sulfur-avid solid comprising the third zone.

Considering the ranges of fluidizing-gas compositions, temperatures, and pressures which may be encountered, and considering the range of density of materials which are candidates for the role of the sulfur-avid solid, I am not able to give precise numerical values covering all circumstances to govern the particle sizes for the sulfur-avid solid and the coke pellets and to prescribe the fluidizing velocities in the several zones. Suitable sizes and velocities can be readily established by experiment.

I believe that the experimentation can be usefully guided by the foregoing remarks concerning the critical size of particle which tends to rise or sink in a fluidized bed of larger or smaller particles respectively. The fluidization velocity in the first zone is preferably greater than about 5 ft./sec., and a suitable minimum size of coke pellet will generally be found to be on the order of $\frac{1}{16}$ inch or larger. The fluidization velocity in the second zone is suitably between about 0.5 and 5 ft./sec. and preferably between about 0.8 and 4 ft./sec. A suitable maximum size of particle of sulfur-avid solid will generally be found to be on the order of 40-mesh (U.S. Standard) or smaller. The fluidization velocity of a third zone, if provided, is suitably between about 0.5 and 2 ft./sec. and preferably between about 0.8 and 1.7 ft./sec.

The term "sulfurous hydrocarbonaceous fuel" as here used embraces, as a first category, solid fuels which when heated either exhibit a softening temperature or begin to decompose with deformation and, as a second category, liquid fuels and solid fuels which when heated exhibit a melting temperature and can thereafter be pumped. Suitable fuels of the first category for practice of the invention are found among bituminous and subbituminous coals and lignites, including many coals ordinarily considered non-caking when viewed in light of conventional atmospheric-pressure coal-carbonization procedures. To use some of the non-caking coals or lignites sucessfully, one must operate the process of the invention at a high pressure and provide for presence of a high partial pressure of hydrogen in the first zone. It is to be understood that bituminous and subbituminous coals and lignites may be altered by a partial carbonization or a partial oxidation or a reduction in the intrinsic moisture (as, for example, in the drying of lignites by the Fleissner Process). Suitable fuels of the first category are also found among such altered coals and lignites, provided the altered material does not contain more than 91 weight percent carbon on a moisture-and-ash-free basis and display a hydrogen-to-carbon atomic ratio below 0.6. Suitable fuels of the second category are generally characterized by high specific gravity, low hydrogen content, a significant aromatic content, and a Conradson carbon greater than about 1 percent, usually greater than 2 percent. Examples are residual fuel oils, cracked residua, asphalts, asphalt fractions prepared from residua by solvent extraction, heavy coker tars, coal tars, pitches, bitumens, carbonaceous matter from tar sands, Gilsonite, kerogens, carbonaceous matter from oil shales, and the like.

A temperature greater than about 1,000° F. is generally sufficient to cause carbonization of a solid fuel or cracking of a liquid fuel charged to the bed of coke pellets. A temperature between about 1,200° F. and 1,500° F. is preferred, and a temperature up to about 1,700° F. is generally serviceable. The fuel is heated almost instantaneously to the bed temperature, and converted almost instantaneously by rapid, initial carbonization or cracking reactions into light gaseous products and a residue of sticky matter which adheres to a pellet of coke. The sticky matter is converted to a thin patch or layer of fresh dry coke by later, slower carbonization or cracking reactions. In general, the sticky matter has a "life" on the order of only a few seconds, from its formation by the initial reactions to its conversion into a dry coke.

By either of the foregoing alternative means for effecting the commingling of coke pellets and the sulfur-avid solid in the second zone, one may ensure that a patch or layer of coke freshly laid down upon a pellet will find itself, in general only a few seconds after its formation, within the desulfurizing environment of the second zone. The fresh coke is desulfurized before "aging" reactions have opportunity to reduce the coke's chemical reactivity and the lability of the sulfur therein. Moreover, sulfur is removed from the coke without $H_2S$ having to diffuse outward from micropores deep within a particle of coke produced much earlier in time in a separate operation.

Successful operation of the process of the invention depends critically upon commencing the operation with a suitable "starter" bed of solid present in the first zone. The starter bed should comprise a "starter solid" displaying a range of particle sizes, preferably at least five-fold, and with a smallest particle not substantially smaller than the minimum size desired for the coke pellets to be made. The starter bed need not be carbonaceous, a solid suitable for use at high temperature and having a density between about 80 and 150 pounds per cubic foot being generally satisfactory.

To ensure removal of sulfur from the coke at a suitable rate, the partial pressure of hydrogen in the second zone should preferably be maintained at a level greater than about 0.5 atmosphere.

A suitable partial pressure of hydrogen can be achieved in the second zone simply through a suitable choice of the carbonization or cracking temperature and pressure, the hydrogen arising as a product of carbonization or cracking. In general, more hydrogen is produced the higher the temperature, but at a given temperature, less hydrogen and more methane are obtained the higher the operating pressure. Those skilled in carbonization and cracking art will readily identify combinations of temperature and pressure which give rise to suitable yield of hydrogen.

A suitable partial pressure of hydrogen can also be ensured in the second zone by arranging that hydrogen be an important constituent of the fluidizing gas to the first zone of the fluidized bed. The partial combustion product of a fuel with air, comprising primarily hydrogen, carbon monoxide, steam, carbon dioxide, and nitrogen, is a preferred gas to constitute at least a major portion of this fluidizing gas.

Calcium oxide is a preferred substance avid to receive sulfur from hydrogen sulfide, the calcium oxide reacting with $H_2S$ to form calcium sulfide, thus:

$$CaO + H_2S = CaS + H_2O \qquad (1)$$

A preferred form of CaO is a solid comprising intermingled microscopic crystallites of calcium oxide and magnesium oxide, such as may be derived by calcining naturally-occurring dolomite or a mixed precipitate of the carbonates of calcium and magnesium. [See my paper in "Fuel Gasification," Advances in Chemistry Series, Number 69 (1967), pages 205–229.] The dolomite-derived solid is rugged and in general possesses good resistance to deactivation by a regeneration conducted at a high temperature. Another preferred form of CaO was disclosed by G. P. Curran, C. E. Fink, and E. Gorin of Consolidation Coal Co. [in the aforementioned Advances in Chemistry Series volume, pages 141–165], who reported that a rugged form of CaO may be prepared by calcining a solid produced by quenching the melt of a mixture of $CaCO_3$ and $Ca(OH)_2$, the melt preferably having a composition slightly enriched in a $CaCO_3$ with respect to the eutectic mixture of these substances.

Calcium oxide may be regenerated from calcium sulfide by roasting the sulfide in presence of the products of the partial combustion of a fuel with air, where the quantity of air supplied to the combustion is just slightly less than the stoichiometric amount for complete combustion. Sulfur is expelled from the roast as $SO_2$, which may be converted to elemental sulfur by a variety of techniques (including reacting of $SO_2$ with $H_2S$ in the well-known Claus process and reacting $SO_2$ with CaS to form sulfur and $CaSO_4$, which could be returned to the roast), or may be converted to sulfuric acid.

My co-pending application Ser. No. 556,434, filed June 9, 1966 and allowed May 28, 1968, teaches that sulfur may be recovered from the calcium sulfide by treatment with superheated steam and carbon dioxide at an elevated pressure, preferably greater than about 4 atmospheres, to yield hydrogen sulfide and calcium carbonate.

$$CaS + H_2O + CO_2 = CaCO_3 + H_2S \qquad (2)$$

The temperature of the treatment is preferably between about 800° and 1,300° F., and higher pressures are required toward the higher temperatures in order to obtain a gas containing $H_2S$ at a concentration high enough for the gas to be conveniently used in a Claus system for the manufacture of sulfur. The calcium carbonate is decomposed by calcining the material in presence of the products of the partial combustion of a fuel with air, the air being supplied to the combustion in a quantity significantly below the stoichiometric amount for complete combustion, so that the gaseous products are sufficiently reducing in character to preserve any calcium sulfide remaining in the solid—i.e., to prevent expulsion of $SO_2$ from the solid as well as to prevent oxidation of CaS to $CaSO_4$. Contrary to my belief when I filed the aforementioned application, presence of reducing gases is not required during the treatment of the calcium sulfide with steam and carbon dioxide. This application taught the recovery of $H_2S$ from CaS present in a solid as microscopic crystallites intermingled with crystallites of MgO. I have discovered that the teachings of the application may also be susbtantially applied to a CaS formed by reacting CaO with $H_2S$ or by reducing $CaSO_4$ with reducing gases or carbon.

If the fluidizing gas is rich in hydrogen and if the pressure is high, the treatment of the fuel in the bed of coke pellets results in production of large amounts of methane, and the treatment may appropriately be termed "hydrocarbonization" or "hydrocracking." Reactions yielding methane are exothermic. At a sufficient partial pressure of hydrogen to the bed, heat from these reactions can supply substantially all of the heat needed to sustain the hydrocarbonization or hydrocracking treatment.

Heat may also be supplied to the bed of coke pellets by preheating the fluidizing gas to a temperature higher than the bed.

A major advantage of the two-zone fluidized-bed arrangement here disclosed is the fact that heat developed in the second zone passes freely downward into the first zone. and any temperature difference between the zones will be small. A preferred method of providing heat needed for the fuel-treating reactions of the first zone is to develop heat in the second zone.

Heat may be developed in the second zone by supplying the sulfur-avid solid to this zone at a temperature greater than the bed, the heat arising from the cooling of the solid.

An advantage of CaO for use as the active ingredient of the sulfur-avid solid is the fact that CaO can also absorb $CO_2$ from gases passing through the second zone:

$$CaO + CO_2 = CaCO_3 \qquad (3)$$

Heat from the recarbonation of CaO by reaction (3) may advantageously supply part of the heat needed in the first zone, the rate of charging of CaO being sufficient for the CaO to absorb a quantity of $CO_2$ as well as sulfur from $H_2S$ arising from the fuel.

If the fluidizing gas contains carbon monoxide, the partial pressure of hydrogen in the desulfurizing second zone may advantageously be increased by measures which promote the water-gas-shift reaction in this zone:

$$H_2O + CO = H_2 + CO_2 \qquad (4)$$

By supplying CaO to the second zone at a rate sufficient to absorb not only $CO_2$ present in the fluidizing gas to the first zone but also $CO_2$ arising from reaction (4), the CaO can be extraordinarily effective in promoting the conversion of CO to $H_2$, by the summation of reactions (3) and (4);

$$CaO + H_2O + CO = CaCO_3 + H_2 \qquad (5)$$

For reaction (5) to occur to a significant extent, the combined partial pressures of $CO_2$ and CO in the fluidizing gas should be greater than the equilibrium decomposition pressure of $CaCO_3$ at the temperature of the fluidized bed.

Crystallites of MgO in the aforementioned solid derivable from dolomite are catalytic for water-gas-shift reaction (4) at temperatures above about 750° F., while CaO has negligible catalytic effect for this reaction. Therefore, the solid derivable from dolomite is preferable to CaO for converting CO to $H_2$, the former solid's advantage being a marked one in roughly the lower half of the aforementioned temperature range from about 1,000° F. to about 1,700° F. recommended for the fluidized bed. At higher temperatures, the water-gas-shift reaction is rapid even in absence of a catalyst specific for the reaction, and the advantage of the solid derivable from dolomite is less.

Steam for reaction (5) can arise from several sources. It may be present in the fluidizing gas to the first zone. Steam may arise from the drying of a coal used as the fuel to be treated. Steam also arises from reaction (1). Addition of steam to the fluidizing gas to the first zone, to supplement steam found in a partial combustion product, for example, is not ordinarily required, but may sometimes be desirable. The effect of adding steam is not only to increase the partial pressure of $H_2$ in the second zone but also to render reaction (5) more effective in supplying heat and thereby to decrease the total requirement of fluidizing gas to the first zone.

Reaction (5) can play a major role in adjusting the ratio of $H_2S$ to $H_2$ downward, as may be necessary to keep this ratio below the critical level previously discussed. If stream is present in the second zone, $H_2S$ will be present in an amount at least in accord with the equilibrium for reaction (1). Reaction (5), by reducing the steam content of the gas, reduces the equilibrium $H_2S$ content as well. [See my aforementioned paper in Advances in Chemistry Series for charts giving the pertinent chemical equilibria.]

The calcining of $CaCO_3$ arising from a treatment of CaS with steam and $CO_2$ has already been mentioned. The greater the role of reactions (3) and (5) in the process, the greater is the quantity of $CaCO_3$ to be decomposed in a calcination zone. This zone advantageously comprises a second fluidized bed, heat being generated in the bed from the partial combustion of a fuel with air. As already mentioned, $H_2$ and CO from the partial combustion preserve CaS from oxidation. Using a partial combustion has another advantage. At a given temperature in the calcination zone, a higher pressure can be maintained in the zone the more one relies upon the formation of CO to supply heat and the less one relies upon the formation of $CO_2$ from carbon in the fuel. The partial pressure of $CO_2$ in the offgas from the calcination zone must be less than the equilibrium decomposition pressure of $CaCO_3$ at the temperature of the zone. If $CO_2$ in the offgas arises both from the fuel and from the decomposition of $CaCO_3$, a lower total pressure is allowable than if most of the fuel is burned to CO. In the latter situation, a good deal of the $CO_2$ arising in the calcination zone is converted to CO and $H_2O$ by the reverse of reaction (4)—typically about one-third of the $CO_2$ from calcining $CaCO_3$ can be removed in this way— and the molar quantity of $CO_2$ in the offgas may even turn out to be less than the molar quantity of $CaCO_3$ supplied to the zone. Greater reliance upon combustion of fuel to CO is to be recommended if one wishes to operate the process at an extremely high pressure, or if one must use a CaO-containing solid which has relatively poor resistance to deactivation through sintering, so that one wishes to select a relatively low temperature for the calcination.

A minor portion of the offgas from the calcination zone is a preferred fluidizing gas to the first zone of the fuel-desulfurization bed. The remaining portion constitutes a lean fuel gas, a product of the process of the invention.

If the process is operated at a pressure greater than about 4 atmospheres, one may advantageously provide a gas-turbine power plant to act in cooperation with the process. Air to a calcination zone may be supplied from the compressor of the gas-turbine plant, sometimes after further compression. A hot gas for expansion in the turbine may be derived by burning the aforementioned lean fuel gas, sometimes after a preliminary expansion, with additional air from the compressor.

If the apparatus of the invention acts in cooperation with a gas-turbine power plant, in the foregoing manner, hydrogen sulfide arising from the treatment of CaS with superheated steam and $CO_2$ may advantageously be converted to elemental sulfur by a novel procedure for conducting the following reaction, here termed the "Claus reaction":

$$2H_2S + SO_2 = 3S + 2H_2O \qquad (6)$$

About one-third of the $H_2S$ is burned with air from the compressor of the gas-turbine plant, sometimes after further compression, to form a gas containing $SO_2$. The remaining $H_2S$ together with this gas is conducted into a pool of water at a temperature between 246° and 320° F. The gases $H_2S$ and $SO_2$ pass readily into solution in the water and react in solution to form liquid sulfur, the melting point of sulfur being 246° F. Above 320° F. the viscosity of sulfur rises sharply, and the separation and the handling of the liquid sulfur would be difficult. The temperature of the pool is preferably just a little below 320° F. The pressure is preferably greater than about 6 atmospheres, the vapor pressure of water at 320° F. Molten sulfur and water are withdrawn from the pool, and are separated. Offgas from the pool, sometimes after a preliminary expansion, is advantageously conducted to the inlet of the turbine of the gas-turbine plant.

Fuel gas from the second zone, or a portion thereof, may be cooled to condense a liquid fuel product, which may be readily separated from a rich fuel gas containing hydrocarbon products of carbonization or cracking.

Fuel gas from the second zone, or a portion thereof, may sometimes advantageously be used as the fuel to the aforementioned partial combustion in the calcination zone. This is particularly advantageous when coal is treated at high pressure and at a temperature of about 1,400° F. or above.

The fuel to the calcination zone may advantageously be a fuel of the aforementioned second category, such as a residual oil, sulfur from the oil being absorbed by CaO present in the calcination zone. A liquid or gaseous fuel is sometimes advantageously used in the calcination zone even when a fuel of the first category is treated in the process of the invention.

Coal for treatment by the process of the invention is advantageously ground to a fineness substantially smaller than 100-mesh. The coal is then advantageously dried and heated with heat from the cooling of the hot coke pellets withdrawn from the fluidized bed. The hot pellets are supplied to the lower zone of a two-zone fluidized bed, and the wet coal is supplied to the upper zone of this bed. The upper zone is preferably at a fluidizing velocity between about 0.5 and about 1.5 ft./sec., and the lower zone is at a much higher velocity, on the order of 10 to 15 ft./sec., say. By virtue of the excellent transfer of heat from the lower to the upper zone, the coke is cooled and the coal is heated and dried. The bed operates at a pressure above atmospheric, so that the coke may be discharged to the atmosphere from the lower zone, and the temperature should be higher than the boiling point of water at the pressure of the bed. A heat exchanger for condensing steam may be placed in the upper zone, should the heat from cooling the coke be insufficient to dry the coal. Coal is withdrawn from the upper zone and charged to the process of the invention, sometimes via a lock-hopper system.

The coke pellets are an excellent fuel for use in a fluidized-bed combustion—better than raw coal on account of the problems caused by evolution of volatile matter from coal in this type of combustion. The coke pellets may advantageously be charged to a bed comprising in the main particles of incombustible matter, the bed being fluidized by air, and heat being withdrawn from the bed to heat-exchange surface. The flux of heat to this surface is outstandingly high, and the heat is advantageously employed to raise and especially to superheat steam.

The steam power cycle disclosed in my aforementioned application Ser. No. 607,231, filed Jan. 4, 1967, is peculiarly advantageous for use in cooperation with a fluidized-bed combustion apparatus. In this cycle, water is pumped to a high pressure and is converted to steam at high temperature and high pressure. The steam is expanded in a series of expansion turbine stages developing power and exhausting steam at a low terminal pressure. Steam is withdrawn at one or more intermediate pressures, is reheated, and is returned to the series of turbine stages, the heat added when the steam is reheated being so large in amount that the steam exhausts at the terminal pressure in a highly superheated condition. The exhausted steam is cooled by heat exchange to water, and at least a major portion of the cooled steam is expanded in a turbine developing power and exhausting at highly subatmospheric pressure to a condenser. The advantage of a fluidized-bed combustion in cooperation with this steam cycle lies in the extraordinarily small amount of heat-exchange surface required to superheat the steam ahead of the series of turbine stages and especially to reheat the steam withdrawn at the intermediate pressures. The low cost of the heat-exchange surface required for these services, by comparison with the far higher cost if a conventional boiler were used, greatly increases the economic attractiveness of the new steam cycle. As my aforementioned application explains, a major advantage of the new steam cycle lies in its ability to absorb significant amounts of heat a low temperature levels without a reduction in cycle efficiency. The conventional steam cycle lacks this property, for heat supplied to the conventional cycle at temperatures below about 470° to 500° F. brings about a reduction in the degree to which water for the cycle may be heated regeneratively by latent heat of steam bled from the steam turbine. Therefore, the new cycle is better adapted to work in cooperation with a gas-turbine cycle, wherein air is heated by compression and cold air is not available to absorb heat from combustion products at temperatures below about 600° F. Combining the new cycle with a fluidized-bed combustion of the coke pellets is especially attractive when the combustion is conducted at an elevated pressure, preferably greater than 4 atmospheres, a gas-turbine power plant cooperating with the combustion by supplying air at high pressure and receiving combustion products for expansion.

If coal is treated by the process of the invention, the aforementioned particles of incombustible matter of the fluidized combustion bed advantageously comprise pellets of ash matter in the coal, and the temperature of the bed is advantageously such that individual particles of ash matter present in the coke pellets adhere to the pellets of ash matter as the individual particles are released from the coke pellets on account of the burning of the coke. For many coals, a suitable temperature can be found between about 1,900° and 2,200° F.

DESCRIPTION OF THE DRAWINGS

The invention including various novel features will be more fully understood by reference to the accompanying drawings and the following description of the operation of the alternatives illustrated therein.

DESCRIPTION OF THE PREFERRED EMBODIMENTS

Figure 1:
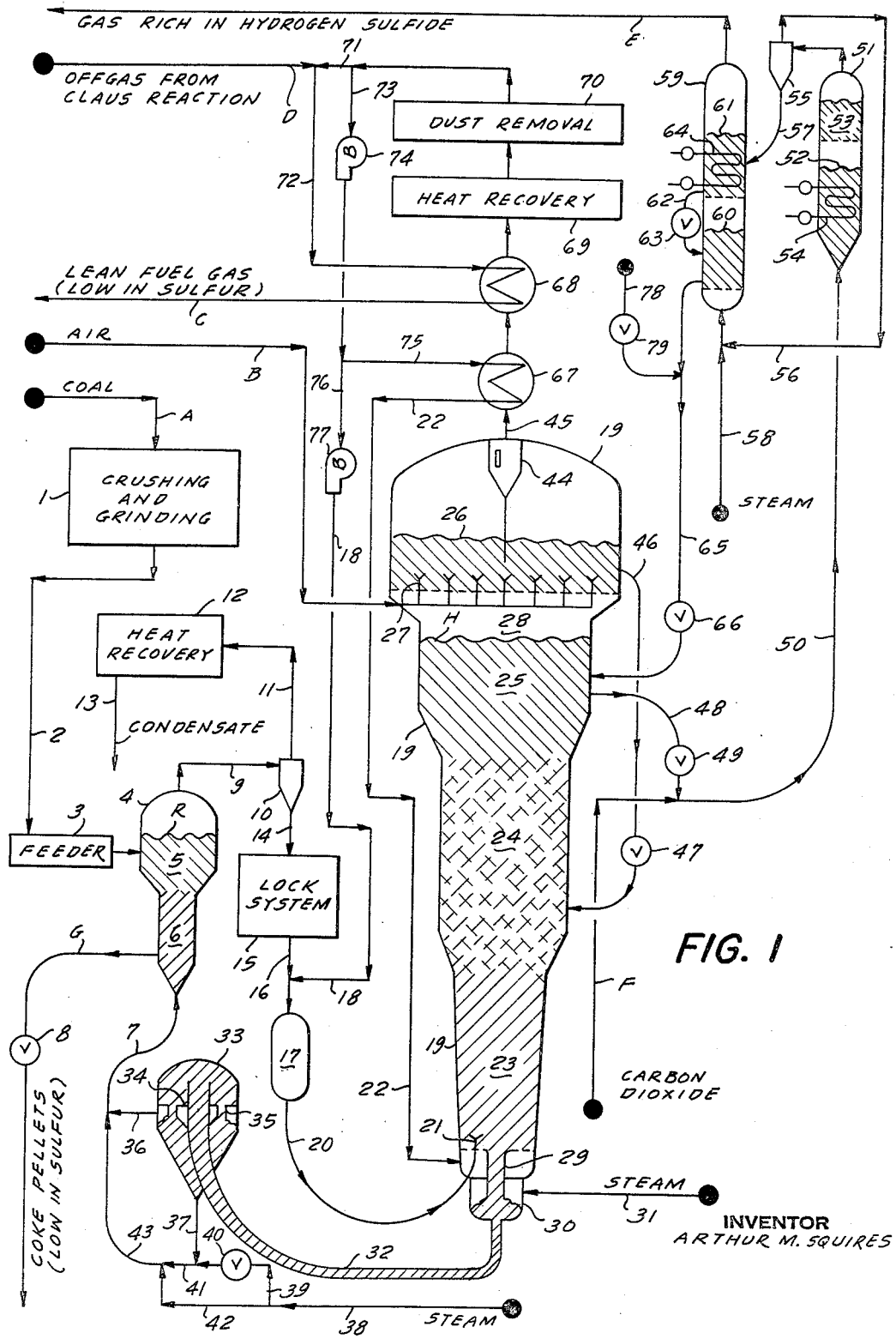
FIG. 1 is a schematic diagram illustrating an agglomerating desulfurization process for treating coal to produce a low-sulfur coke suitable for shipment and a lean fuel gas suitable for combustion in equipment to produce baseload power.

I now describe the agglomerating desulfurization process for coal which is illustrated schematically in FIG. 1, and, concurrently, provide a numeral example which illustrates a preferred embodiment of this process.

Bituminous coal, of a type representative of coals widely used for power generation in the United States, is supplied to the process at 80° F. through conduit A in an amount comprising 489,448 pounds per hour of moisture-and-ash-free (m.a.f.) coal and 51,221 pounds per hour of ash. The m.a.f. coal has the following analysis (expressed in weight percent):

| | |
|---|---|
| Carbon | 80.70 |
| Hydrogen | 5.47 |
| Sulfur | 3.72 |
| Nitrogen | 1.62 |
| Oxygen | 8.49 |

The higher heating value (HHV) of the coal supplied amounts to 7,155.7 million of British thermal units per hour (MMB.t.u./hr.). Crushing and grinding equipment 1 reduces the coal to a particle size such that substantially all of the coal passes through a 100-mesh screen (U.S. Standard). Coal is supplied from equipment 1 via conduit 2 to screw feeder 3, which injects the coal into coal-drying vessel 4. Coal flowing in conduit 2 is accomplished by 105,152 pounds per hour of adventitious and intrinsic moisture.

Coal-drying vessel 4 houses fluidized bed R, comprising two superposed, contingous fluidized bed zones operating at 300° F.: an upper zone 5 comprising coal of substantially minus -100-mesh size, and a lower zone 6 comprising pellets of coke of a size suitably ranging from about $\frac{1}{12}$ to about $\frac{3}{4}$ inch.

Coke of the aforementioned size range, in an amount of 333,057 pounds per hour of m.a.f. coke and 51,211 pounds per hour of contained ash, is introduced into the bottom of zone 6 at substantially 1,400° F. together with 1,138.1 pound-moles per hour (m./hr.) of steam. The coke is a product of the process, arising in a manner to be described hereinafter. The m.a.f. coke has the following analysis (expressed in weight percent):

| | |
|---|---|
| Carbon | 95.92 |
| Hydrogen | 1.33 |
| Sulfur | 0.30 |
| Nitrogen | 1.43 |
| Oxygen | 1.02 |

The coke's HHV is 4,898.6 MMB.t.u./hr. It is withdrawn at 300° F. from zone 6, and delovered from the process via line G at a rate controlled by valve 8.

The superficial fluidizing velocity in zone 6 is suitably 15 ft./sec., say, and the velocity in zones 5 is suitably 1 ft./sec., say, the diameter of zone 6 being suitably smaller than the diameter of zone 5 in order that these velocities may obtain. The velocities should be chosen so that substantially no coal particles appear at the inlet to line G from zone 6 and substantially no coke particles are entrained overhead from zone 5. Commingling of the larger cake and smaller coal particles occurs in a transition region between the two zones, and heat is transferred from zone 6 to zone 5, thereby cooling the coke and heating and drying the coal.

Dried coal is entrained in the offgas from zone 5, the coal and gas leaving vessel 4 at 300° F. and 25 pounds per square inch absolute (p.s.i.a.) via line 9. The gas comprises 5,395.4 m./hr. of steam.

Coal and steam are separated in cyclone gas-solid separator 10, from which the steam is conducted via line 11 to heat recovery equipment 12, where the steam is condensed, to form condensate leaving the process via line 13. Heat recovered in equipment 12 is advantageously used in apparatus for removing $CO_2$ from flue gas, to be described in connection with FIG. 2.

The coal-drying arrangement depicted in FIG. 1 has two outstanding advantages: the volume of gas from which the dried coal must be separated is outstandingly small, and the separation need not be especially clean, for coal not separated from steam in cyclone 10 may be concentrated in a portion of the water from line 13 and returned to feeder 3.

Coal from cyclone 10 is transferred via pipe 14 to a conventional lock system 15, where the coal is pressured to 397 p.s.i.a. The coal in pipe 14 carries 28,456 pounds per hour of intrinsic moisture. Coal is delivered intermittently from lock system 15 via line 16 to coal feed chamber 17, which is supplied with coal-injection gas from line 18. Coal-desulfurization vessel 19 receives coal from feed chamber 17 at a substantially constant rate via a multiplicity of lines 20 and nozzles 21. For simplicity of the drawing, only one line 20 and one nozzle 21 are shown. Fluidizing gas is supplied to the bottom of vessel 19 via line 22 at 350 p.s.i.a. Gases in lines 18 and 22 are of the same composition, and their summation comprises (expressed in m./hr.):

| | |
|---|---|
| Co | 1,251.9 |
| $H_2$ | 1,815.6 |
| $CO_2$ | 644.2 |
| $H_2O$ | 1,359.9 |
| $H_2S$ | 3.64 |
| COS | 0.12 |
| $N_2$ | 3,962.3 |
| A | 49.4 |

Coal-desulfurization vessel 19 houses two fluidized beds, a lower bed H at 1,400° F. and an upper bed 26 at 1,740° F. Fluidizing gas to bed H comprises the gases in lines 18 and 22 already described. Fluidizing gas to bed 26 comprises the offgases from bed H and air, supplied at 1,300° F. and 320 p.s.i.a. via line B and nozzles 27.

Bed H comprises three superposed, contiguous fluidized-bed zones: a lower zone 23 comprising pellets of coke of the aforementioned size range, an upper zone 25 comprising a solid derived from naturally-occurring dolomite rock of a particle size suitably ranging from about 40-mesh to about 325-mesh, and a middle zone or region 24 comprising an intermingling of the coke and the dolomite-derived solid. Offgases from zone 25 convey the dolomite-derived solid across void space 28 and into bed 26.

Zone 23 is an agglomerating coal-carbonization zone, which preferably has the form of a frusto-conical chamber with a gradual taper and the smaller end at the bottom. The fluidizing velocity is suitably 20 ft./sec., say, at the zottom of zone 23, and suitably 15 ft./sec., say, at the top. Coal entering zone 23 is heated almost instantaneously to substantially the bed temperature, and carbonization of the coal is initiated practically instantaneously. Almost at once, the coal is split into a gasous fraction, comprising mainly methane and hydrogen, and a sticky, semi-fluid residue. The latter is "captured" by a coke pellet, sticking thereto to form a "smear" upon the surface of the pellet. Zone 23 of coke pellets serves as a "dust trap" for the sticky initial carbonization residue. Further coking reactions, which occur more slowly, transform the sticky smear into dry coke and cause additional gases to be evolved. However, the residue of carbonization remains sticky for only a time on the order of a very few seconds. Coke is withdrawn from zone 23 via pipe 29 at the bottom.

Middle region 14 is a coke and gas desulfurization zone, and its fluidizing velocity is suitably 3 ft./sec., say. Zone 25 is a classification zone, and its fluidizing velocity is suitably 1 ft./sec., say. The fluidization velocities in zones 23 and 25 should be chosen so that substantially none of the dolomite-derived solid appears in pipe 29, and so that substantially none of the coke is conveyed across void space 28 into bed 26. The fluidizing velocity at the top of zone 23 should be sufficient to promote turbulent intermingling of coke pellets and dolomite-derived solid in middle region 24. In other words, gas should leave zone 23 at a velocity sufficient to produce a geysering of coke pellets upward into region 24 for a substantial distance. In this way there is effected a continual, rapid interchange of coke pellets between zone 23 and region 24.

The dolomite-derived solid comprises an intimate intermingling of microscopic crystallites of $CaCO_3$, CaO, CaS, and MgO. Natural dolomite, the double carbonate of calcium and magnesium, seldom contains these two elements in precisely one-to-one atomic ratio, the calcium usually being present in excess. Ideally, however, dolomite may be written $CaCO_3 \cdot MgCO_3$. Solids derived by half-calcining or fully-calcining dolomite may be written $[CaCO_3+MgO]$ and $[CaO+MgO]$ respectively, to signify the fact that neither of these solids is a true chemical species, but comprises an intimate intermingling of crystallites of the chemical species included between the brackets. The solid derived by allowing one of these solids to absorb sulfur may be written $[CaS+MgO]$. The dolomite-derived solid in region 24 and zone 25, suitably, comprises 2 parts $CaCO_3$, 1 part CaO, 1 part CaS, and 4 parts MgO, on a molar basis.

Sulfur in form of $H_2S$ arises in vessel 19 not only as a direct result of carbonization of the coal but also as an indirect result of cracking of tar species and of attack by hydrogen upon coke. Substantially all of the $H_2S$ is absorbed by the dolomite-derived solid:

$$[CaO+MgO]+H_2S=[CaS+MgO]+H_2O \qquad (1a)$$

The avidity of CaO for $H_2S$ is responsible for the effectiveness of the attack by hydrogen upon the coke pellets to form $H_2S$ and a low-sulfur coke product. As explained hereinbefore, this reaction is inhibited at even low ratios of $H_2S$ to $H_2$.

The dolomite-derived solid also absorbs $CO_2$ in region 24:

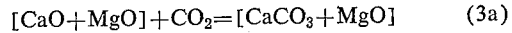
$$[CaO+MgO]+CO_2=[CaCO_3+MgO] \qquad (3a)$$

The crystallites of MgO in the dolomite-derived solid are catalytic for the water-gas-shift reaction,

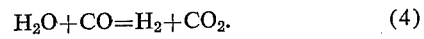
$$H_2O+CO=H_2+CO_2. \qquad (4)$$

The solid is extremely effective in promoting the conversion of CO to $H_2$, by the summation of reaction (3a) and (4):

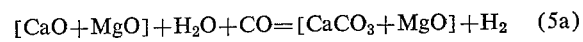
$$[CaO+MgO]+H_2O+CO=[CaCO_3+MgO]+H_2 \qquad (5a)$$

Reaction (5a) is important in helping to bring about a favorably low ratio of $H_2S$ to $H_2$ in region 24. The reaction not only increases the partial pressure of $H_2$ but also eliminates a large part of the steam arising from vaporization of intrinsic moisture entering vessel 19 with the coal. Too much steam in region 24 would cause there to be too much $H_2S$, on account of the equilibrium relationship between steam and $H_2S$ according to reaction (1a). The ratio of $H_2S$ to $H_2$ in gas from region 24 is about 1 to 700, and effective coke desulfurization is obtained.

The partial pressure of $H_2$ in fluidizing gas to zone 23 is about 70 p.s.i.a., and that in region 24 is about 85 p.s.i.a. The high partial pressure of $H_2$ not only helps to extract sulfur from the coke but also helps to promote cracking reactions which desulfurize tar species of the carbonization reactions occurring in zone 23.

The effectiveness of region 24 for coke desulfurization is due in part to the freshness of the coke. A carbon or char or coke maintained at a high temperature, especially above about 1,200° F., undergoes "aging" reactions which shift its constituent atoms into structural positions of lower energy, rendering the material less reactive. A major advantage of the process of the instant invention is the practical simultaneity of the carbonization and coke desulfurization activities. Within a very few seconds of its formation, a fresh patch of coke, still highly reactive chemically, finds itself geysering upward into region 24, and the patch is desulfurized as it drifts downward through this region. Since it is exposed on the surface of a pellet, no diffusion of $H_2$ into the interior of the pellet, nor of hydrogen sulfide from the interior, is necessary for reaction to occur. The time needed for desulfurizing the fresh patch of coke is extremely short relative to the time needed to desulfurize a complete particle of a coke produced many minutes earlier in a separate carbonization operation.

Downpipe 29, through which coke pellets are withdrawn from zone 23, terminates within a small extension of vessel 19, indicated at 30. Steam is introduced in an amount of 626.0 m./hr. via line 31 into the space surrounding the skirt of downpipe 29 within extension 30. Steam enters the bed of coke across a surface formed at substantially the coke's angle of response at the bottom edge of downpipe 29. A small portion of the steam, 56.9 m./hr., flows upward into downpipe 29, countercurrent to the downward flow of coke pellets. This stream serves to prevent gases from zone 23 from flowing out with the coke in pipe 29. The coke and the remaining steam move from extension 30 via pipe 32 to gas-disengaging vessel 33, where the steam is disengaged from the coke at a pressure of about 35 p.s.i.a. Pipe 32 is preferably built with a gradually expanding cross-section, larger at the outlet end, to maintain the velocity of steam relative to the velocity of the coke approximately constant as the steam pressure declines. The upper part of vessel 33 is substantially filled with coke, which moves downward across plate 34 via a multiplicity of downpipe 35 (only two of which are shown in the drawing, for simplicity). Steam disengages from the coke across surfaces which form, at substantially the angle of repose of the coke, at the bottom edges of the downpipes 35. The disengaged steam leaves vessel 33 via line 36, and the coke flows downwardly by gravity via line 37 from a conical bottom of vessel 33. Steam is supplied at about 40 p.s.i.a. from line 38 at 569.1 m./hr. A minor portion of the steam flows through line 39 via valve 40 to the bottom of line 37, where this steam serves to move coke from line 37 through horizontal line 41. A major portion of steam from line 38 flows via line 42 to the terminus of line 41, from which the steam conveys the coke upward via line 43 into line 7. The steam from line 36 also flows into line 7. The movement of coke through line 32 is sustained by the large pressure drop across this line. The movement of coke downward through line 37 is sustained by gravity. The flow of steam across valve 40 is the control on the rate of discharge of coke pellets from bed 23. If valve 40 is closed, no coke can move, since the bed of coke in line 37 will then form an angle of repose at the junction of line 37 and lines 39 and 41.

Bed 26 is a calcination zone. The flow of materials across space 28, from zone 25 to bed 26, comprises (expressed in m./hr.):

| | |
|---|---:|
| CO | 91.3 |
| $H_2$ | 4,045.5 |
| $CO_2$ | 102.4 |
| $H_2O$ | 4,383.3 |
| $H_2S$ | 5.7 |
| $N_2$ | 4,075.3 |
| $CH_4$ | 2,505.2 |
| $C_2H_6$ | 164.2 |
| $C_3H_{10}$ | 391.9 |
| $CaCO_3$ | 3,318.4 |
| CaS | 1,659.2 |
| CaO | 1,659.2 |
| MgO | 6,636.8 |

Air to bed 26 comprises 20,167.0 m./hr. The fuel constituents in the aforementioned gases entering bed 26 from space 28 are subjected to partial combustion in bed 26, and $CaCO_3$ is decomposed by the reverse of reaction (3a). Gaseous effluent from bed 26, leaving vessel 19 at 1,740° F. via cyclone gas-solid separator 44 and line 45, comprises (expressed in m./hr.):

| | |
|---|---:|
| CO | 6,259.3 |
| $H_2$ | 9,078.1 |
| $CO_2$ | 3,221.1 |
| $H_2O$ | 6,799.5 |
| $H_2S$ | 18.2 |
| COS | 0.6 |
| $N_2$ | 19,811.7 |
| A | 247.1 |

Solid is returned at 1,740° F. from bed 26 to a lower elevation of region 24 via line 46 and valve 47 in an amount comprising (expressed in m./hr.):

| | |
|---|---:|
| CaS | 1,646.1 |
| CaO | 4,990.7 |
| MgO | 6,636.8 |

Each of the aforementioned reactions (1a), (3a), (4), and (5a) are exothermic. Heat is generated in region 24 and zone 25 by these reactions, and heat is developed in region 24 by the cooling of the solid from line 46. Heat is transferred from zone 25 to region 24 and from region 24 to zone 23, thereby furnishing the endothermic heat needed in zone 23. Viewed overall, the agglomerating desulfurization process is autogenous, heat being supplied by the partial combustion of the gaseous fuel products of the agglomerating coal carbonization step.

Solid in the following amount (expressed in m./hr.) is withdrawn from zone 25 via line 48 and valve 49:

| | |
|---|---:|
| $CaCO_3$ | 1,550.0 |
| CaS | 775.0 |
| CaO | 775.0 |
| MgO | 3,100.0 |

The solid is conveyed by a gas comprising 1,524.6 m./hr. $CO_2$ and 19.9 m./hr. $H_2O$, introduced at 376° F. and 360 p.s.i.a. via line F, through line 50 into the bottom of recarbonation vessel 51. Vessel 51 houses two superposed fluidized beds 52 and 53. Fluidizing gas to bed 52 is the $CO_2$ flowing in line 50, and the offgas from bed 52 fluidizes bed 53 and conveys partially recarbonated solid thereinto. The purpose of vessel 51 is to convert substantially all CaO in the solid to $CaCO_3$, thereby permitting the solid to be exposed subsequently to a partial pressure of steam in excess of that which would convert CaO to $Ca(OH)_2$. Formation of $Ca(OH)_2$ is to be avoided, for this would cause the solid to decrepitate. Bed 52 is provided with cooling surface 54, whereby the temperature of bed 52 may be regulated, by trial and error, to achieve the maximum degree of recarbonation of the solid. Gas and recarbonated solid leave vessel 51 at the top and flow into cyclone gas-solid separator 55, which delivers the gas to line 56 and the solid to downpipe 57. The gas in line 56, together with 2,021.9 m./hr. of steam supplied via line 58 at 460° F. and 340 p.s.i.a., flows into the bottom of sulfur-desorption vessel 59, which houses two superposed fluidized beds 60 and 61. The principal reaction occurring in these beds is $$[CaS+MgO]+H_2O+CO_2 = [CaCO_3+MgO]+H_2S \quad (2a)$$

Solid enters bed 61 from pipe 57, and flows downward from bed 61 to bed 60 via line 62 and valve 63. Fluidizing gas to bed 60 is the combination of gases from lines 56 and 58. Fluidizing gas to bed 61 is the offgas from bed 60. Bed 61 is provided with cooling surface 64, whereby the temperature is regulated at 1,000° F. Bed 60 is without cooling surface, and the exothermic heat of reaction (2a) serves to raise the temperature of the solid to 1,200° F., at which temperature solid is returned to zone 25 of bed H via line 65 and valve 66. The flow in line 65 (expressed in m./hr.) is:

| | |
|---|---:|
| CaCO$_3$ | 2,846.6 |
| CaS | 253.4 |
| MgO | 3,100.0 |

A gas rich in hydrogen sulfide flows at 1,000° F. from the top of vessel 59 via line E, comprising (expressed in m./hr.):

| | |
|---|---:|
| H$_2$S | 520.0 |
| COS | 1.6 |
| CO$_2$ | 226.4 |
| H$_2$O | 1,521.9 |

Heat recovered from vessels 51 and 59, by means of cooling surfaces 54 and 64, is advantageously used to raise or to superheat high-pressure steam.

Gas from vessel 19, in line 45, is cooled to 1,685° F. in heat-exchanger 67, and to 1,180° F. in heat exchanger 68. The gas is further cooled to 700° F. in heat-recovery equipment 69, which may suitably comprise equipment for raising high-pressure steam. Dust is eliminated from the gas in dust-removal equipment 70, which may suitably comprise apparatus for scrubbing the gas with a heavy residual oil having an initial boiling temperature several hundred degrees above 700° F. Eighty percent of the gas from step 70, at 308.6 p.s.i.a., is sent via line 71 to be blended in line 72 with an offgas, at 300° F., from a vessel for conducting the Claus reaction (to be described in connection with FIG. 2), supplied from line D. This offgas comprises (expressed in m./hr.):

| | |
|---|---:|
| H$_2$O | 307.5 |
| CO$_2$ | 228.1 |
| N$_2$ | 969.6 |
| A | 12.2 |

The combined gases, constituting a lean fuel gas, are heated to 1,300° F. in heat-exchanger 68 and delivered at 300.9 p.s.i.a. via line C.

Twenty percent of the gas from step 70 is sent via line 73 to blower 74, where its pressure is raised to 352.7 p.s.i.a. The major part of the gas from blower 74 is sent via line 75 to heat-exchanger 67, where this part of the gas receives 27.5 MMB.t.u./hr. of heat from the effluent from vessel 19. A minor part of the gas from blower 74 is sent via line 76 to blower 77, where its pressure is raised to 397 p.s.i.a. Blower 77 delivers coal-injection gas to line 18. The split in gas flow between lines 75 and 76 is best determined empirically, since the needful quantity of coal-injection gas will depend upon details of the design of coal-injection lines 20 and nozzles 21. If, for example, a fraction 0.31684 of the gas from blower 74 is needed in line 76, the temperature of the fluidization gas in line 22 will be 1,300° F. The aforementioned fraction is an upper limit on the probable requirement for coal-injection gas in line 18.

It is noteworthy that the three sources of the hydrogen passing through desulfurization region 24 are roughly comparable in importance: the hydrogen arising directly from the carbonization of the coal; the hydrogen arising indirectly from the partial combustion of hydrocarbons in bed 26 and recycled to zone 23 via line 73; and the hydrogen arising within region 24 from reaction (5a).

In order to maintain the reactivity of the dolomite-derived solid at a high level, it is advantageous to add relatively small quantities of dolomite intermittently from line 78 to line 65 via valve 79. Just before each addition, a withdrawal of a small amount of the solid can conveniently be made by closing valve 63 for a brief interval, thereby causing solid to accumulate in bed 61 and to be carried overhead into line E along with the gas rich in H$_2$S.

Line 78 may also be used to add a bed of a starter solid to zone 23 prior to starting to operate the process of FIG. 1. A preferred starter solid comprises coke pellets of the aforementioned size range.

Figure 2:
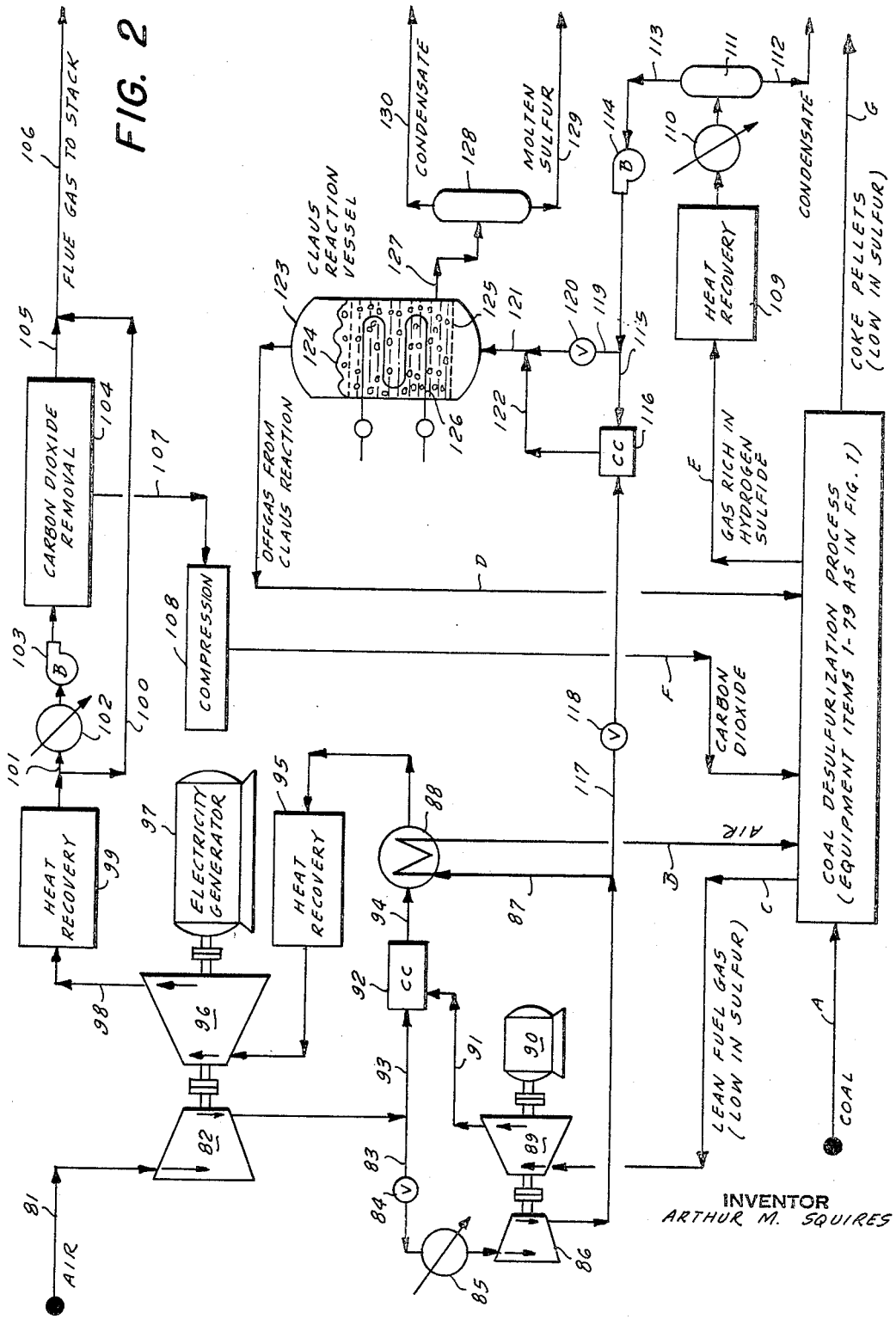
FIG. 2 is a flow diagram illustrating equipment for power generation and for heat and sulfur recovery, to act in cooperation with the process illustrated in FIG. 1.

Turning now to FIG. 2, I continue the numerical example of a preferred embodiment. Lines A, B, C, D, E, F, and G in FIG. 2 perform the same function as the corresponding lines in FIG. 1.

Atmospheric air, in an amount of 56,611.9 m./hr., is introduced via conduit 81 at 80° F. and 14.17 p.s.i.a. The air is compressed to 120.4 p.s.i.a. in compressor 82. Air in an amount of 21,181.9 m./hr. from the discharge of compressor 82 is directed via line 83, valve 84, and cooler 85 to compressor 86. This air is cooled to 100° F. by heat exchange against atmospheric cooling water in cooler 85, and is compressed to 330.7 p.s.i.a. in compressor 86. Air in an amount of 20,167.0 m./hr. from the discharge of compressor 86 is directed via line 87 to heat-exchanger 88, where the air is heated to 1,300° F. Air from exchanger 88 is delivered via line B to the coal desulfurization process already described in connection with FIG. 1. This process delivers lean fuel gas, already described, at 1,300° F. and 300.9 p.s.i.a. via line C to the inlet of expansion turbine 89, where the fuel gas is expanded to 120.4 p.s.i.a. The work developed by turbine 89 serves to drive air compressor 86 and electricity generator 90. The expanded fuel gas is delivered at 1,100° F. from turbine 89 via line 91 to combustion chamber 92 (designated in FIG. 2 by a rectangle containing the letters "CC"). Here the fuel is burned with the remaining air from the discharge of compressor 82, delivered to combustion chamber 92 via line 93. Combustion products from chamber 92 comprise (expressed in m./hr.):

| | |
|---|---:|
| CO$_2$ | 7,812.8 |
| H$_2$O | 13,025.1 |
| SO$_2$ | 15.0 |
| O$_2$ | 1,231.5 |
| N$_2$ | 44,287.3 |
| A | 554.8 |

The products are directed via conduit 94 to heat-exchanger 88, where they are cooled by heat exchange against air, and to heat recovery equipment 95, where they are cooled to 1,600° F., suitably by providing heat to raise or to superheat high-pressure steam. Gases from equipment 95 are delivered at 1,600° F. and 114.4 p.s.i.a. to the inlet of expansion turbine 96, where the gases are expanded to 14.37 p.s.i.a. Power developed in turbine 96 is used to drive air compressor 82 and electricity generator 97. The expanded gases are delivered at 929° F. from turbine 96 via line 98 to heat recovery equipment 99, wherein the gases are suitably cooled to about 577° F. by heat exchange against high-pressure water provided to equipment 99 at about 470° to 500° F., and are suitably further cooled to about 442° F. in a boiler which furnishes 2,021.9 m./hr. of steam at 350 p.s.i.a. and 460° F. to be used in the coal-desulfurization process (at lines 31, 38, and 58 of FIG. 1). A major portion of the gas from equipment 99 is diverted via line 100. A minor portion is sent via line 101, cooler 102, and blower 103 to carbon-dioxide-removal equipment 104. This equipment is suitably a conventional monoethanolamine (MEA) scrubbing system for removing $CO_2$ from gas. In this system, a solution of MEA in water is used to absorb $CO_2$. Heat at about 240° F. is needed to desorb $CO_2$ from its solution in MEA. As previously mentioned, heat obtained by condensing steam in heat recovery equipment 12 of FIG. 1 suitably provides a significant portion of this heat. The remaining heat supply for this purpose will be described hereinafter. Gas from equipment 104, in line 105, and gas in line 100 are combined in line 106 and sent to a stack (not shown in FIG. 2). Carbon dioxide from equipment 104 is sent via line 107 to compression equipment 108, which delivers the carbon dioxide at 360 p.s.i.a. to line F.

Gas rich in $H_2S$, at 1,000° F. in line E, is cooled in heat recovery apparatus 109, wherein the gas is suitably cooled to about 590° F. by heat exchange against high-pressure water provided to apparatus 109 at about 470° to 500° F., and is suitably further cooled to about 260° F. to provide a portion of the heat needed in equipment 104. Gas from heat recovery apparatus 109 is further cooled to 100° F., by heat exchange against atmospheric cooling water, in cooler 110. The mixture of gas and condensate from cooler 110 is separated in separating-drum 111, from which 1,517.9 m./hr. of condensate is delivered from the process via line 112, along with any solid carried overhead from bed 61 of FIG. 1 via line E. Gas from drum 111 is delivered via line 113 to blower 114, where its pressure is raised to 330.7 p.s.i.a. One-third of the gas from blower 114 is delivered via line 115 to combustion chamber 116, where the gas is burned with remaining air from compressor 86, delivered to chamber 116 via line 117 and valve 118. Two-thirds of the gas from blower 114 is sent via line 119 and valve 120 to be mixed in line 121 with combustion products from chamber 116, delivered to line 121 via line 122. The combined gases in line 121, containing approximately one mole of $SO_2$ from the combustion in chamber 116 for each two moles of $H_2S$, flow into the bottom of Claus reaction vessel 123. Vessel 123 houses water pool 124, into which the gases from line 121 flow across perforated plate 125, suitably at a superficial velocity of 0.1 ft./sec. The temperature of water pool 123 is controlled at 300° F. by removing heat across heat-transfer surface 126 contained therein. The heat is suitably used to provide a further portion of the heat needed in equipment 104. For purpose of the present discussion, the chemical reaction, $$2H_2S + SO_2 = 3S + 2H_2O \qquad (6)$$

is termed the "Claus reaction." The reaction takes place in water pool 124, to provide a liquid discharge of water and sulfur in line 127. The water and sulfur are separated in separating-drum 128, from which 521.6 m./hr. of molten sulfur is delivered from the process at 300° F. via line 129, and 216.4 m./hr. of condensate is delivered at 300° F. via line 130. Offgas from the Claus reaction vessel 123, already described, is sent at 300° F. via line D to the coal desulfurization process of FIG. 1. An advantage of the arrangement shown in FIG. 2 for conducting the Claus reaction is its extreme simplicity by comparison with conventional equipment now in use for conducting this reaction at atmospheric pressure. The conventional equipment generally comprises several fixed beds of pelletized catalyst. The arrangement of FIG. 2 takes advantage of the fact that the reaction proceeds rapidly when the gases $H_2S$ and $SO_2$ are dissolved in water. By conducting the reaction in water at an elevated pressure and at a temperature above the melting point of sulfur, 246° F., one obtains molten sulfur which can be separated from water more readily than can be the colloidal sulfur which is obtained when the reaction is conducted in water at low temperature.

An energy balance for the above-described example of the process for desulfurizing coal is as follows (expressed both in MMB.t.u./hr. and in percent):

|  |  | Percent |
|---|---|---|
| Input; HHV of coal input | 7,155.7 | 100.0 |
| Outgoes: |  |  |
| (1) HHV of coke product | 4,898.6 | 68.46 |
| (2) Heat to raising or superheating high-pressure steam (high-pressure water being supplied at 470° to 500° F.) | 1,230.3 | 17.19 |
| (3) Net shaft work (before an allowance for mechanical losses and power to auxiliaries) | 234.4 | 3.28 |
| (4) Heating value of sulfur product | 66.6 | 0.93 |
| (5) Losses | 720.9 | 10.08 |
| Total | 7,150.8 | 99.93 |

The energy balance may be converted into a "practical" energy budget by recognizing that the foregoing energy items (2) and (3) have a practical value, in terms of the heating value of raw coal, higher than the numbers set down above. The raw fuel equivalent of heat supplied to steam may be reckoned by assuming a boiler efficiency of 89 percent; i.e., coal in an amount of

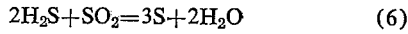

$$1,230.3/0.89 = 1,382.3$$

MMB.t.u./hr. would have to be burned to provide 1,230.3 MMB.t.u./hr. of heat to raise steam, if this were done in a conventional coal-fired boiler. The raw fuel equivalent of the net shaft work may be estimated by deducting 5% for mechanical losses and power to auxiliaries, and by considering the fact that coal in an amount of about 8,700 B.t.u. would have to be burned to provide 1 kilowatt-hour of electricity from a modern, conventional coal-fired power station; i.e., the electricity available from the process has a worth in coal amounting to $$234.4 \times 0.95 \times 8,700/3,412.75 = 567.7$$

MMB.t.u./hr. The practical energy budget, then is:

|  |  | Percent |
|---|---|---|
| (1) HHV of coke product | 4,898.6 | 68.46 |
| (2) Coal equivalent of heat to steam | 1,382.3 | 19.32 |
| (3) Coal equivalent of electricity sent out | 567.7 | 7.93 |
| (4) Heating value of sulfur product | 66.6 | 0.93 |
| Total | 6,915.2 | 96.64 |

The practical efficiency of the process, 96.64%, is seen to be outstandingly high. The electricity sent out from the example of the process amounts to 65,250 kilowatts.

The example of the invention is well suited for use in cooperation with a large, already-existing, conventional fossil-fuel-fired power station. Generally, at no loss of efficiency, such a station could furnish to the process of the invention a quantity of boiler-feed-water (BFW) at about 470° to 500° F. suitable for absorbing heat item (2) of the foregoing enerby balance—i.e., heat available from equipment items 54, 64, and 69 of FIG. 1 and from equipment items 95, 99, and 109 of FIG. 2. The process could return BFW heated to a higher temperature, or high-pressure steam, or superheated high-pressure steam. Ideally, the process of the invention should operate continuously at a constant input of coal. Accordingly, the aforementioned 65,250 kilowatts of electricity is best suited to meet a baseload demand, and the cooperating conventional power station should preferably never be turned down in capacity so low that it is unable to supply the BFW needed for the several heat recoveries. Coke pellets may be stored, and they may be burned in the cooperating power station at a variable rate consistent with the varying demand for power.

Alternatively, the above-described example could be utilized together with its own steam power system to utilize the several heat recoveries, the coke pellets being shipped to other locations. Under this alternate, the example would provide on the order of 225,000 kilowatts of baseload power.

Figure 3:
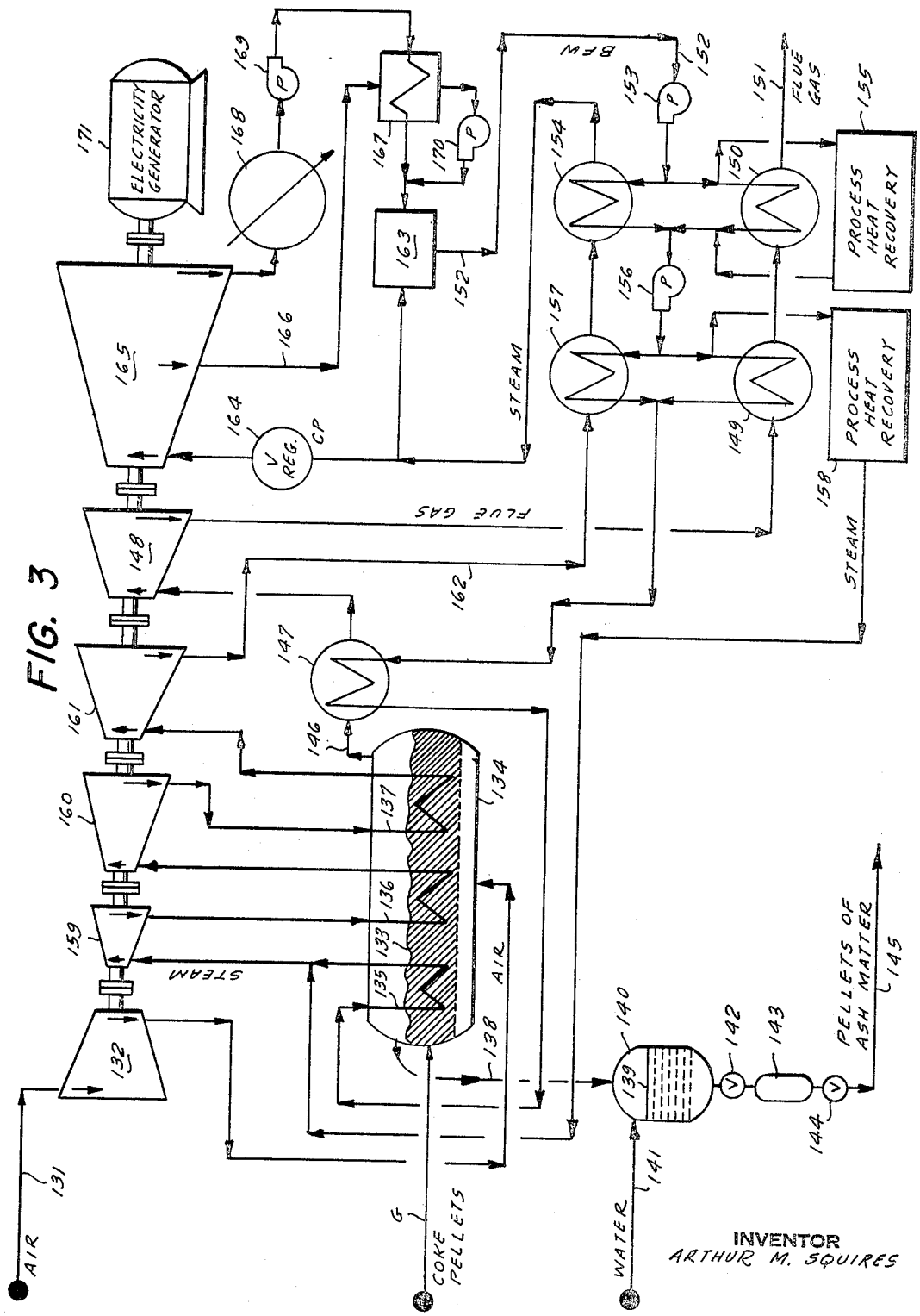
FIG. 3 is a schematic diagram showing a preferred method for generating power from the low-sulfur coke produced by the process of FIG. 1.

Turning now to FIG. 3, I describe a preferred method for generating power from the low-sulfur coke supplied by the above-described example of the process of the invention, and, concurrently, provide a numerical example which illustrates the method. Use of the method requires several minor modifications of the aforementioned example, which will be readily understood by reference to FIGS. 1 and 2 during the discussion to follow.

Atmospheric air, in an amount of 135,402.5 m./hr., is introduced via conduit 131 at 80° F. and 14.17 p.s.i.a. The air is compressed to 120.4 p.s.i.a. in compressor 132 and is supplied as fluidizing gas to fluidized bed 133 housed in coke-combustion vessel 134. Coke pellets in an amount of 333,057 pounds per hour of m.a.f. coke and 51,221 pounds per hour of ash contained therein are introduced into bed 133 from line G. In order to facilitate the feeding of the coke to bed 133, vessel 4 of FIG. 1 should preferably operate at about 135 p.s.i.a. and 350° F. Fluidized bed 133 is in contact with heat-exchanger surfaces 135, 136, and 137, whereby heat from the combustion of the coke is transferred to water or steam. Heat-exchanger surfaces 135, 136, and 137 are preferably vertical and are preferably disposed around the outer periphery of bed 133.

Bed 133 comprises primarily pellets of ash matter, suitably having diameters ranging from 1/16 inch to 1/2 inch, and the fluidizing velocity in bed 133 is suitably 15 ft./sec. The inventory of coke within bed 133 at any given instant is a small fraction of the bed. The temperature should be such that conditions within bed 133 are agglomerizing with respect to the ash matter in the coke. In other words, as ash matter in the coke is liberated because of the wasting away of the carbon-stuff through combustion, each tiny particle of ash matter so liberated should be captured by a pellet of ash matter, which accordingly grows bigger. In general, a suitable temperature for ash matter from a wide range of coals can be found between about 1,900° and 2,200° F. An adjustment of the temperature for practicing the agglomeration of ash matter in a fluidized-bed combustion can be effected by adding constituents to the coal before it enters vessel 19 via the charging-lines 20, the added constituents altering the fusion characteristics of the non-coaly matter present in the feed to vessel 19 of FIG. 1. For example, one could reduce the fusion temperature of an ash which is unusually high in silica by adding a constituent rich in calcium.

Pellets of ash matter are withdrawn from bed 133 by overflow into pipe 138, down which the pellets fall into pool of water 139 housed in vessel 140. Water is supplied to vessel 140 through line 141. From time to time, ash pellets and water are withdrawn from vessel 140 via valve 142 into lock-chamber 143, from which the material may be let down to the atmosphere via valve 144 and discharged from the operation via line 145.

Combustion products leave vessel 134 via line 146 in the following amounts (expressed in m./hr.):

| | |
|---|---:|
| $CO_2$ | 26,599.9 |
| $H_2O$ | 2,199.0 |
| $SO_2$ | 31.2 |
| $O_2$ | 827.8 |
| $N_2$ | 105,824.5 |
| A | 1,326.9 |

The products are cooled to 1,600° F. by heat-exchange against water in exchanger 147, and are expanded from 114.4 p.s.i.a. to 14.37 p.s.i.a. and 9.23° F. in expansion turbine 148. The expanded gases are cooled in heat-exchangers 149 and 150 against water, and are delivered at 300° F. to a stack (not shown in FIG. 3) via line 151.

Boiler-feed-water (BFW) at about 206.8° F., flowing in line 152 at a rate of 194,091.8 m./hr., is pumped from about 13.25 p.s.i.a. to about 700 p.s.i.a. in pump 153, and the water is heated in exchangers 150 and 154 and in process heat recovery equipment 155 (acting upon parallel flows of the BFW) to a temperature between about 400° and 450° F. The BFW is then pumped to about 3,000 p.s.i.a. in pump 156, and is further heated in exchangers 149 and 157 and in process heat recovery equipment 158 (acting upon parallel flows of the BFW). BFW from exchangers 149 and 157 is combined and further heated in exchanger 147 and heat-exchange surface 135. Steam is delivered from process heat recovery equipment 158 and heat-exchange surface 135 to the inlet of expansion turbine 159 at 2,400 p.si.a. and 1,200° F., and the steam is expanded in turbine 159 to about 474 p.s.i.a. Steam from turbine 159 is reheated to 1,200° F. in heat-exchange surface 136 and is delivered to turbine 160 at about 427 p.s.i.a. and 1,200° F. The steam is expanded in turbine 160 to about 84.3 p.s.i.a., and is again reheated to 1,200° F., in heat-exchange surface 137. The steam from surface 137 enters turbine 161 at about 75.9 p.s.i.a. and is expanded in this turbine to about 15 p.s.i.a., leaving the turbine at about 767° F. Steam from turbine 161 is delivered via line 162 to heat-exchangers 157 and 154, where the steam is cooled to about 260° F. A minor portion of the steam, viz., 9,606.5 m./hr., is sent at 260° F. from heat-exchanger 154 to BFW heater 163, where this steam is condensed, supplying heat to raise the temperature of BFW. Heater 163 is of the open-contact type. The remaining major portion of the steam, at a pressure of 14.4 p.s.i.a., flow through regulating valve 164 and into low-temperature, low-pressure turbine 165. Regulating valve 164 is governed to maintain the pressure directly upstream of the valve at a level 0.23 p.s.i.a. above the atmosphere, i.e., at 14.4 p.s.i.a. when the atmosphere is at 14.17 p.s.i.a. This serves to maintain a small positive pressure on the steam side of exchangers 154 and 157. The steam expands in turbine 165 to 0.9492 p.s.i.a., leaving the turbine at 100° F. in a wet condition. A second minor portion of the steam, viz., 9,833.0 m./hr., is extracted from turbine 165 at about 5.15 p.s.i.a., through line 166, and is delivered to BFW heater 167 at about 4.74 p.s.i.a., where this steam is condensed, supplying heat to raise the temperature of BFW. Heater 167 is of the indirect or closed type. Steam from turbine 165 is condensed in condenser 168, by heat exchange against atmospheric cooling water or atmospheric air, and the condensate is pumped in pump 169 to a pressure of about 20 p.s.i.a. The pumped BFW is heated in heater 167 to about 155° F. The drain of condensate from heater 167, at about 160° F., is pumped in pump 170, and the discharge from pump 170 is combined with the main flow of BFW from heater 167. The combined flow is heated in heater 163 to about 206.8° F., and the drain from heater 163 is supplied to pump 153 via line 152.

Turbines 159, 160, 161, 148, and 165 furnish power to drive air compressor 132 and electricity generator 171. The arrangement depicted in FIG. 3, where the turbines, the compressor, and the generator are shown as being linked via a common shaft, is schematic, separate drives for compressor and generator sometimes being preferable.

Process heat recovery equipment 155 and 158 comprise a number of items of equipment appearing in FIGS. 1 and 2; items 54, 64, and 69 of FIG. 1; items 95 of FIG. 2; and that portion of items 99 and 109 not required to furnish steam to the process of FIG. 1 or heat for $CO_2$-removal equipment 104. In addition, heat recovery equipment 155 suitably includes equipment for recovering 123.6 MMB.t.u./hr. of low-level heat which appears in the foregoing energy balance for FIGS. 1 and 2 among the 720.9 MMB.t.u./hr. of losses. This recovery is accomplished by supplying heat to BFW from heat in the air in line 83 of FIG. 2 down to 300° F., by supplying to BFW the heat available to heat recovery apparatus 109 from 590° to 385° F., and by supplying to BFW the heat in the gases in lines 100 and 101 from 442° down to 300° F. A major advantage of the steam power cycle used in FIG. 3, which is characterized by an intake into the steam of an unusually large amount of reheat in the course of the steam's expansion, is the cycle's ability to absorb relatively large amounts of heat at low temperature levels without loss of cycle efficiency. This cycle is the subject of my co-pending application Ser. No. 607,231, filed Jan. 4, 1967.

The combination of the coal-desulfurization process of FIGS. 1 and 2, modified as noted above, with the coke-combustion and power-generation method depicted in FIG. 3, will generate a total of about 896.500 kilowatts of electricity sent out (after 5% losses). By reference to the foregoing energy balance for the coal-desulfurization process, one sees that the net input of fuel heating value which is chargeable to this electricity is $$7,155.7 - 66.6 = 7,089.1 \text{ MMB.t.u./hr.}$$

The heat rate is thus seen to be about 7,910 B.t.u. per kilowatt-hour, an outstandingly low figure.

A particular advantage of the arrangement depicted in FIG. 3 lies in the extraordinarily high rate of transfer of heat per unit of surfaces 135, 136, and 137. The steam cycle of FIG. 3 is rendered more attractive by the smallness of the surface required at 136 and especially at 137 by comparison with the surface required if the heat were transferred to the steam from gases in absence of fluidized solids.

An historic trend in the design of gas-turbine power plant has permitted the specification of ever higher temperatures at the inlet of expansion turbines. This trend is expected to continue in the future, and within a short time designs may become available permitting use of a temperature appreciably higher than 1,600° F. at the inlet to turbine 148. An expansion turbine like 148 is able to accept a small amount of dust in the gas entering the turbine, but as temperature rises, the amount of dust which is acceptable in the gas falls. As better turbines become available, a modification of FIGS. 2 and 3 may be preferred, in which the gas in line 146 is further cooled below 1,600° F. by heat-exchange against BFW or steam and is subjected to a dust-removal step, preferably at 700° F. or above. The gas in line 146 could then advantageously be reheated to the desired turbine-inlet temperature by combining this gas with at least a portion of the gas in line 94 of FIG. 2. In this modification, the role of heat recovery equipment 95 and turbine 96 of FIG. 2 is either reduced or eliminated.

Figure 4:
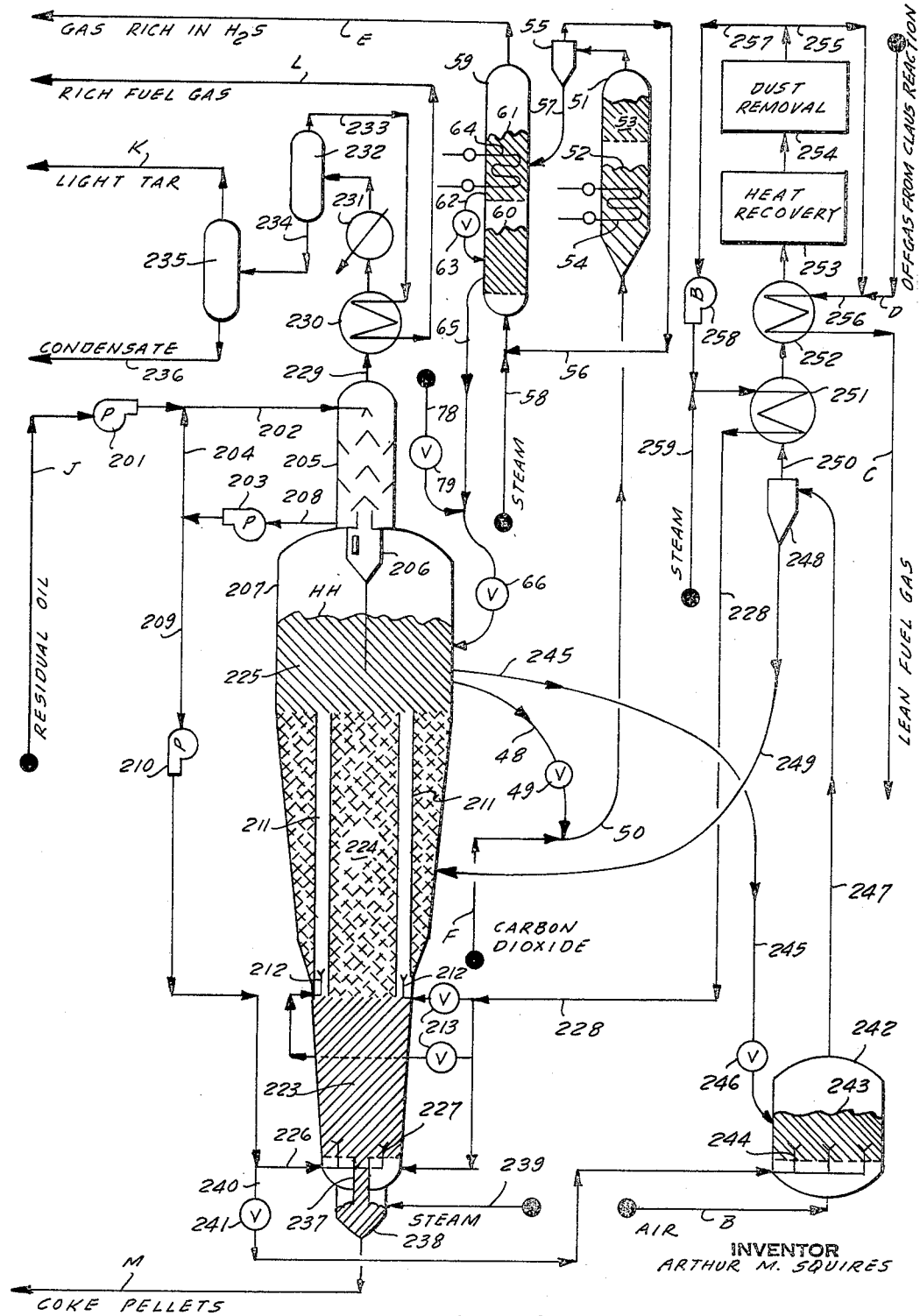
FIG. 4 is a schematic diagram illustrating an agglomerating desulfurization process for treating residual oil to produce a light tar and a coke, each low in sulfur and suitable for shipment, a rich fuel gas suitable for combustion in a nearby existing conventional boiler with little modification of the boiler required, and a lean fuel gas suitable for combustion in equipment to provide baseload power.

Turning now to FIG. 4, I describe the agglomerating desulfurization process for residual oil which is illustrated schematically therein, and, concurrently, provide a numerical example which illustrates a preferred embodiment of this process.

Residual oil of 10.0° API gravity, 181 SFS viscosity at 122° F., and 16.7% Conradson carbon, is supplied at 213° F. to the process of FIG. 4 through conduit J in an amount of 424,498 pounds per hour. The oil has the following analysis (expressed in weight percent):

| | |
|---|---:|
| Carbon | 84.60 |
| Hydrogen | 10.40 |
| Sulfur | 4.73 |
| Moisture | 0.27 |

The HHV of the oil shipped amounts to 7,566.6 MMB.t.u./hr. The oil is pumped to 220.4 p.s.i.a. in pump 201, and is blended in line 202 with oil at 700° F. from the discharge of pump 203, supplied to line 202 via line 204. Oil from line 202 is supplied to the top of quench tower 205, in which the oil is heated by direct contact with hot gases from cyclone gas-solid separator 206 at the top of oil-desulfurization vessel 207. Oil heated to 700° F. is supplied from the bottom of quench tower 205 to pump 203 via line 208. Oil in an amount equal to that entering via conduit J (less moisture) is sent from pump 203 via line 209 to pump 210, where the oil is pumped to 262 p.s.i.a.

Oil-desulfurization vessel 207 houses fluidized bed HH operating at 1,300° F. Fluidizing gas is supplied to bed HH at 1,300° F. and 260 p.s.i.a. from line 228, the gas comprising (expressed in m./hr.):

| | |
|---|---:|
| CO | 1,985.1 |
| $H_2$ | 873.2 |
| $CO_2$ | 879.4 |
| $H_2O$ | 1,621.7 |
| $H_2S$ | 1.6 |
| COS | 0.2 |
| $N_2$ | 4,589.8 |
| A | 57.6 |

Bed HH comprises three superposed, contiguous fluidized-bed zones: a lower zone 223 comprising pellets of coke of a size suitably ranging from about ½ inch to ¾ inch, an upper zone 225 comprising a solid derived from naturally-occurring dolomite rock of a particle size suitably ranging from about 40-mesh to 325-mesh, and a middle zone or region 224 comprising an intermingling of the coke and the dolomite-derived solid. This solid suitably comprises 2 parts $CaCO_3$, 1 part CaS, 1 part CaO, and 4 parts MgO on a molar basis. Zone 223, region 224, and zone 225 perform broadly the same functions and operate broadly in a similar manner as zone 23, region 24, and zone 25 respectively, already described in connection with FIG. 1.

Zone 223 is an agglomerating oil-cracking zone, having suitably a superficial fluidizing velocity of 20 ft./sec., say at the bottom, and suitably a velocity of 15 ft./sec., say, at the top. A fraction amounting to 0.7041807 of the oil from pump 210 is fed to the bottom of zone 223 via line 226 and nozzles 227. Oil entering zone 223 is quickly cracked to form vapor products and a coke residue which is laid down as a thin layer of fresh coke upon some of the coke pellets comprising zone 223.

Region 224 is a zone for desulfurizing the oil vapors and the layer of fresh coke. Region 224, like zone 223, is advantageously in the form of a frusto-conical chamber with a gradual taper and the smaller end at the bottom. The fluidizing velocity in region 224 is suitably 3 ft./sec. at the bottom and 1 ft./sec. at the top. Region 224 contains several vertical pipes 211, open at both top and bottom, into each of which a small amount of gas is introduced from line 228 via valve 213 and nozzle 212. Coke pellets are conveyed upward through each pipe 211, and are thereby introduced at the top of region 224. The pellets drift downward through region 224 and undergo desulfurization during their passage through this region of bed HH.

Zone 225 is a classification zone, and its fluidizing velocity is suitably 1 ft./sec., say. The fluidizing velocities in zones 223 and 225 should be chosen so that substantially none of the coke is present at the upper level of bed HH and that substantially none of the dolomite-derived solid is present at the bottom of bed HH.

The partial pressure of hydrogen in fluidizing gas to zone 223 is about 25 p.s.i.a., and that in the gas in region 224 is about 65 p.s.i.a. Of the hydrogen passing through region 224, nearly one-half arises from reaction (5a) occurring in this region. The remainder arises directly from the cracking of the oil and from the gas entering via line 228. The instant example of the invention illustrates how effectively reaction (5a) can be relied upon to raise the partial pressure of hydrogen and to lower the partial pressure of steam, thereby reducing the ratio of $H_2S$ to $H_2$. This ratio is about 1 to 2,500 respectively in the gases from region 224, and these gases accordingly have great desulfurizing power.

The temperature of the desulfurized gases from zone 225 is reduced from 1,300° F. to 700° F. in quench tower 205. Gases are sent from tower 205 at 220.4 p.s.i.a. via line 229 to heat-exchanger 230, where they are cooled to 300° F. The gases are further cooled to 100° F. in cooler 231 by heat exchange against atmospheric cooling water, with condensation of water and light tar. Gas and liquids from cooler 231 are separated in drum 232, and the gas is sent via line 233 to heat-exchanger 230, where the gas is heated to 650° F. The gas from exchanger 230 is a rich fuel gas and is delivered from the process via line L. The gas has a higher heating value of 542 B.t.u. per Standard Cubic Foot (S.C.F., measured at 60° F. and 1 atmosphere), and comprises (expressed on a m./hr. basis):

| | |
|---|---:|
| $CH_4$ | 1,377.9 |
| $C_2H_4$ | 1,155.8 |
| $C_2H_6$ | 236.9 |
| $C_3H_6$ | 484.4 |
| $C_3H_8$ | 172.7 |
| $C_8H_{10}$ | 21.6 |
| CO | 298.9 |
| $H_2$ | 3,838.6 |
| $CO_2$ | 44.8 |
| $H_2O$ | 53.0 |
| $H_2S$ | 1.5 |
| $N_2$ | 4,589.8 |
| A | 57.6 |

The HHV of the gas is 2,538.1 MMB.t.u./hr. It may advantageously be expanded in a turbine to a pressure a few p.s.i. above atmospheric and delivered for combustion in a conventional steam boiler. Alternatively, the rich fuel gas may advantageously be expanded in a turbine to about 8 atmospheres and burned at this pressure in a supercharged boiler.

An advantage of the instant example of the invention is that the heating value of the rich fuel gas in line L is sufficiently great that the gas can be conveyed to a nearby existing power-station boiler in a line of a reasonable size, and can be burned therein without any changes being required to increase the size of the space for combustion.

Liquid from drum 232 is withdrawn via line 234 and sent to liquid-liquid separating drum 235, from which 384.3 m./hr. of water condensate is withdrawn at the bottom and sent from the process via line 236, and 823.1 m./hr. of a light tar (having a molecular formula $C_8H_{10}$) is withdrawn at the top and delivered from the process via line K. The HHV of the light tar is 1,615.5 MMB.t.u./hr.

Coke pellets are withdrawn from bed 223 via downpipe 237, which terminates within a small extension of vessel 207, indicated at 238. Steam is introduced from line 239 into extension 238 at an elevation above the surface of the coke bed which is formed at the angle of repose of the coke beneath the bottom edge of downpipe 237. Coke pellets are withdrawn from extension 238 and delivered from the process via line M. The rate of coke production is 101,290 pounds per hour, the coke's HHV is 1,620.7 MMB.t.u./hr., and its analysis (expressed in weight percent) is:

| | |
|---|---:|
| Carbon | 96.8 |
| Hydrogen | 3.1 |
| Sulfur | 0.1 |

For simplicity of the drawing of FIG. 3, equipment for cooling the coke in line M is not shown. The coke may advantageously be conducted via line M into a vessel like vessel 33 of FIG. 1 for disengaging steam, and the coke may be conveyed from this vessel into a fluidized bed, into which water is injected directly, to be vaporized therein and to take up heat from the coke.

The remaining oil from pump 210 is sent via line 240 and valve 241 to calcination vessel 242, which houses fluidized bed 243 operating at 1,740° F. Oil is injected from line 240 into bed 243 via nozzles 244. Fluidizing gas to bed 243 is air at 1,300° F. and 234 p.s.i.a., supplied to the bottom of vessel 242 from line B in an amount of 26,480.2 m./hr. Solid in the following amount (expressed in m./hr.) is withdrawn from zone 225 of bed HH via line 245 and valve 246 and delivered to bed 243:

| | |
|---|---:|
| $CaCO_3$ | 4,050.6 |
| CaS | 2,025.3 |
| CaO | 2,025.3 |
| MgO | 8,101.2 |

Oil is partially combusted with air in bed 243, and the $CaCO_3$ in the solid from line 245 is decomposed by the reverse of reaction (3a). Gaseous and solid products from bed 243 leave vessel 242 at the top via line 247 at 225 p.s.i.a. and 1,740° F. and in the following amounts (expressed in m./hr.):

| | |
|---|---:|
| CO | 8,936.5 |
| $H_2$ | 3,931.2 |
| $CO_2$ | 3,958.9 |
| $H_2O$ | 2,539.5 |
| $H_2S$ | 7.4 |
| COS | 0.8 |
| $N_2$ | 20,662.5 |
| A | 259.5 |
| CaO | 5,898.8 |
| CaS | 2,202.4 |
| MgO | 8,101.2 |

The gas and solid are separated in cyclone gas-solid separator 248, from which the solid moves to a lower elevation of region 224 of bed HH via line 249. Gases from cyclone 248, in line 250, are cooled to 1,640° F. in heat-exchanger 251, to 1,110° F. in heat-exchanger 252, and to 700° F. in heat recovery equipment 253. Dust is removed from the gas in dust-removal equipment 254, which may suitably comprise apparatus for scrubbing the gas with heavy residual oil. A fraction 0.777866 of the gas from step 254 is sent via line 255 to be blended at 220.4 p.s.i.a. in line 256 with an offgas at 300° F., from a vessel for conducting the Claus reaction (similar to vessel 123 of FIG. 2). This offgas is supplied from line D and comprises (expressed in m./hr.):

| | |
|---|---:|
| $CO_2$ | 374.9 |
| $H_2O$ | 362.9 |
| $N_2$ | 1,143.8 |
| A | 14.4 |

The combined gases, constituting a lean fuel gas, are heated to 1,300° F. in heat-exchanger 252 and delivered at 214.9 p.s.i.a. in line C.

The remaining gas from step 254 is sent via line 257 to blower 258, where its pressure is raised to 262 p.s.i.a. The gas from blower 258 is blended with 1,057.6 m./hr. of stem at 460° F., supplied from line 259. The combined gases are heated to 1,300° F. in exchanger 251 and supplied to line 228 to serve as fluidizing gas to bed HH.

Solid in the following amount (expressed in m./hr.) is withdrawn from zone 225 of bed HH via line 28 and valve 49:

| | |
|---|---:|
| $CaCO_3$ | 1,828.6 |
| CaS | 914.3 |
| CaO | 914.3 |
| MgO | 3,657.2 |

The solid is conveyed by a gas comprising 1,904.5 m./hr. $CO_2$ and 31.3 m./hr. $H_2O$, supplied at 342° F. and 253 p.s.i.a. via line F, through line 50 into the bottom of recarbonation vessel 51. Equipment items 48 through 66 and items 78 and 79 of FIG. 4 operate substantially in the same manner as the corresponding items of FIG. 1, and it will be sufficient here merely to note minor differences in their operation. Steam is supplied to vessel 59 from line 58 at 460° F. in an amount of 2,377.6 m./hr. Gas rich in $H_2S$, delivered at 1,000° F. and 225 p.s.i.a.

from vessel 59 via line E, comprises (expressed in m./hr.):

| | |
|---|---|
| $H_2S$ | 613.5 |
| COS | 1.9 |
| $H_2O$ | 1,795.5 |
| $CO_2$ | 372.9 |

Solid is returned at 1,200° F. from vessel 59 via line 65 and valve 66 to zone 225 of bed HH in an amount comprising (expressed in m./hr.):

| | |
|---|---|
| $CaCO_3$ | 3,358.3 |
| CaS | 298.9 |
| MgO | 3,657.2 |

No new principles being involved, one can readily see how to arrange power-generation and heat and sulfur recovery apparatus, along the lines depicted in FIG. 2, to cooperate with process of FIG. 4—viz, equipment to generate power from the lean fuel gas in line C, to recover sulfur from the gas rich in $H_2S$ in line E, to provide the Claus offgas in line D, and to supply the $CO_2$ in line F. The air flow rate required for process and power will be found to be substantially the same as the flow in line 81 to compressor 82 in FIG. 2. If the rich fuel gas is expanded in a turbine to 16.17 p.s.i.a., reheated to 700° F. against products of the combustion of the lean fuel gas, and delivered to a combustion for power generation, the following overall energy balance (expressed both in MMB.t.u./hr. and in percent) is obtained:

| | | Percent |
|---|---|---|
| Input, HHV of residual oil input | 7,566.6 | 100.0 |
| Outgoes: | | |
| (1) HHV of light tar product | 1,615.5 | 21.35 |
| (2) HHV of coke product | 1,620.7 | 21.42 |
| (3) HHV of rich fuel gas product | 2,538.1 | 33.54 |
| (4) Sensible heat of rich fuel gas | 72.6 | 0.96 |
| (5) Heat to raising or superheating high-pressure steam (high-pressure water being supplied at 470° to 500° F.) | 949.3 | 12.55 |
| (6) Net shaft work (before an allowance for mechanical losses and power to auxiliaries) | 187.3 | 2.48 |
| (7) Heating value of sulfur | 78.6 | 1.04 |
| (8) Losses | 510.5 | 6.75 |
| Total | 7,572.6 | 100.08 |

Energy item (4) has a practical value, in terms of the heating value of raw residual oil, about 0.6 as great as the value set down above, viz, 72.6×0.6=43.6. At an assumed boiler efficiency of 89 percent, item (5) has a practical value of 949.3/0.89=1,066.6. With a deduction of 5% for mechanical losses and power to auxiliaries and by considering that about 9,500 B.t.u. of residual oil would have to be burned to provide 1 kilowatt-hour of electricity from a modern, conventional oil-fired power station, one sees that item (6) has a practical value of 187.3×0.95×9,500/3,412.75=495.2. A practical energy budget, then, is:

| | | Percent |
|---|---|---|
| (1) HHV of light tar product | 1,615.5 | 21.35 |
| (2) HHV of coke | 1,620.7 | 21.42 |
| (3) HHV of rich fuel gas | 2,538.1 | 33.54 |
| (4) Oil equivalent of sensible heat of rich fuel gas | 43.6 | 0.58 |
| (5) Oil equivalent of heat to steam | 1,066.6 | 14.10 |
| (6) Oil equivalent of electricity sent out | 495.2 | 6.54 |
| (7) Heating value of sulfur | 78.6 | 1.04 |
| Total | 7,458.3 | 98.57 |

The practical efficiency of the overall process, 98.57%, is seen to be exceptionally high. The electricity sent out from the example amounts to 52,130 kilowatts. The example is well suited for use in cooperation with a large, already-existing, conventional fossil-fuel-fired power station, which can supply BFW at about 470° to 500° F. suitable for recovering heat item (5) of the foregoing energy balance. The cooperating power station could receive the rich fuel gas product for combustion therein to raise steam. Coke pellets and light tar could be stored, and their use rate governed to meet a varying demand for electricity from the station. Alternatively, these products may be shipped to other locations.

I do not wish my invention to be limited to the particular embodiments illustrated in the drawings and described above in detail. Other arrangements will be recognized by those skilled in the art, as well as other purposes which the invention can serve.

Deserving of mention is the utility of the invention for producing a rich fuel gas from which a gas of so-called "pipeline quality"—having a heating value on the order of 900 B.t.u./S.C.F. or higher—may be readily derived. Such a rich gas may be produced from either residual oil or coal in a vessel much like vessel 207 of FIG. 4, with the difference that the fluidizing gas in a line like line 228 should preferably be rich in $H_2$ and CO and should contain little if any $N_2$.

A preferred source for this fluidizing gas is the product of the reaction between steam and the coke pellets produced by the process of the instant invention. This reaction may advantageously be conducted in a slagging-grate gasifier of the type disclosed in U.S. Patent 3,253,906 (May 31, 1966) and discussed in my aforementioned application Ser. No. 561,551, filed June 29, 1966, the endothermic heat of the reaction being supported by combustion of coke pellets with oxygen supplied to the gasifier along with steam. Another attractive possibility would be to conduct the reaction between steam and the coke pellets in a fluidized-bed gasifier, to which a fluidizing gas comprising steam and oxygen is furnished. When coal is used in the process, the fluidized gasification bed may advantageously operate at a temperature such that conditions within the bed are agglomerizing with respect to the ash matter in the coke. Oxygen may advantageously be supplied to the aforementioned slagging-grate or fluidized-bed gasifiers from the process of my U.S. Patent 3,324,654 (June 13, 1967), in which oxygen is absorbed from high-pressure air by beds of barium oxide. If this process is used, air-depleted-in-oxygen, furnished at high pressure by the process, may advantageously constitute a portion of the fluidizing gas to a calcination vessel like vessel 242, in order to increase the power of the gas from this vessel for carrying $CO_2$.

The reaction between steam and the coke pellets might also be conducted in a fluidized bed having an upper and a lower zone, like zones 5 and 6 respectively of fluidized bed R of vessel 4 in FIG. 1. Steam would be supplied to a bed of the coke pellets in a lower zone like zone 6, the fluidizing velocity being suitably 15 ft./sec. A solid containing CaO would be supplied to an upper zone like zone 5, the solid suitably having a particle size between about 40-mesh and 325-mesh, and the upper zone suitably being fluidized at 1 ft./sec. Heat from reactions (3) and (5) occurring in the upper zone would sustain the endothermicity of the steam-carbon reaction occurring in the lower zone. The temperature would suitably be about 1,600° to 1,700° F. Gasification of the coke pellets in the fluidized bed would preferably not be complete, partially gasified pellets being withdrawn from the lower zone. These could be used as a fuel for steam-raising, or could advantageously be ground extremely fine and used as a fuel in a combustion occurring in a calcination vessel like vessel 242. The partial pressure of steam in the upper zone must not exceed about 13 atmospheres, or the solid containing CaO will become sticky and its fluidization become impossible. Notice, however, that the arrangement here disclosed has the advantage that substantially pure steam may be supplied to the lower zone at a pressure considerably higher than 13 atmospheres. Reaction of steam within the lower zone would serve to reduce the steam partial pressure below the allowable limit in the gas entering the upper zone. Other proposals have been made [for examples, see U.S. Patent 2,705,672 (April 5, 1955) and the aforementioned Report to OCR by F. W. Theodore] for equipment in which the recarbonation of lime and the steam-carbon reaction are conducted within a single fluidized-bed zone comprising an intermingling of the carbon with a solid containing lime. The earlier proposals have the disadvantage, with respect to the arrangement here disclosed, that fluidizing gas to the aforementioned single fluidized bed has comprised a mixture of steam and a recycle of gaseous product from the bed. The recycle was necessary in order to keep the partial pressure of steam in the bed below 13 atmospheres, but this has the serious disadvantage that hydrogen in the recycle gas inhibits the steam-carbon reaction.

In the examples of FIGS. 1 and 4, a major portion of the fluidizing gas to the fuel desulfurization bed is the product of the partial combustion of a fuel with air. A product of the complete combustion of a fuel may sometimes advantageously be used, with the temperatures of the coal or oil desulfurization bed preferably raised to a level such that the steam-carbon reaction occurs at an appreciable rate—preferably to about 1,600° F. or above. This is in order that $H_2$ and CO arising from the steam-carbon reaction may be present in desulfurization regions 24 and 224 of FIGS. 1 and 4 respectively. If a complete combustion product is used, it may advantageously be supplied to the fuel desulfurization bed at a temperature higher than that of the bed. Steam, or steam mixed with air, or steam mixed with oxygen may also be used as the fluidizing gas to the coal or oil desulfurization bed, the bed preferably operating at 1,600° F. or above. These alternatives tend to increase the production of fuel gas and to decrease the production of coke.

Gases and vapors arising from the carbonization or cracking of the coal or oil may sometimes advantageously be recycled to be used as at least part of the fluidizing gas to the coal or oil desulfurization bed. When this is done, an advantageous addition to the fluidizing gas is either $CO_2$ or steam and CO, so that heat may be generated in the desulfurization bed by reaction (3) or (5).

The scheme of FIG. 1 could be modified by withdrawing a rich fuel gas product from space 28, with the effect that only a part of the fuel gases arising from the carbonization of the coal is committed to the partial combustion with air in bed 26. Such a modified scheme could also advantageously be used with residual oil replacing the coal of FIG. 1.

In the above-described examples of the invention, the dolomite-derived solid was subjected to a maximum temperature of 1,740° F. A wide range of naturally-occurring dolomite rocks may be calcined at this temperature without serious loss of reactivity on account of sintering and loss of surface area. Some rocks exist, having unusually low rations of Ca to Mg, which may be calcined without serious harm at temperatures well over 1,740° F., up to about 1,900° F. If a rock is available which may be calcined at a higher temperature, the operating temperature of bed 26 in FIG. 1 and of bed 243 in FIG. 4 may advantageously be increased. The operating pressures in vessel 19 of FIG. 1 and vessels 207 and 242 of FIG. 4 may then also be raised, taking advantage of the higher equilibrium decomposition pressure of $CaCO_3$ at the higher operating temperature.

If zone 25 of FIG. 1 is omitted, one may sometimes advantageously allow coke pellets, especially pellets of smaller sizes, to be entrained from region 24 along with dolomite-derived solid into bed 26, where the coke would act as at least a part of the fuel burned therein. Partially burned coke could be returned along with calcined solid to region 24. In FIG. 4, one could arrange for delivery of a mixture of coke pellets and dolomite-derived solid via line 245 to bed 243, and partially burned coke would return to region 224 via line 249.

I claim:

1. A process useful in the preparation of sulfur and the desulfurization of a sulfurous fuel with production of fuel products low in sulfur, comprising:
    (a) charging a sulfurous hydrocarbonaceous fuel to a first zone of a first fluidized bed, said first zone comprising pellets of coke at a temperature sufficient to cause carbonization or cracking of said fuel with production of fuel gases and a coke product adhering to said pellets,
    (b) fluidizing said first zone with a gas containing hydrogen, carbon monoxide, steam, and carbon dioxide, the combined partial pressure of carbon dioxide and carbon monoxide in said gas exceeding the equilibrium decomposition pressure of calcium carbonate at said temperature,
    (c) supplying a solid containing calcium oxide to a second zone of said first fluidized bed at a rate such that the amount of calcium oxide supplied is sufficient to absorb substantially all of the sulfur contained in said fuel to form calcium sulfide and to absorb as well a molar quantity of carbon dioxide amounting to a major portion of the combined molar quantity of carbon dioxide and carbon monoxide in said gas, said second zone being superposed on said first zone and contiguous therewith and larger in cross-sectional area and receiving fluidizing gas therefrom, said solid comprising particles of sizes smaller than said coke pellets,
    (d) effecting a commingling of said coke pellets and said solid containing calcium oxide in said second zone, said calcium oxide absorbing sulfur from said fuel gases and from said coke product adhering to said pellets and absorbing carbon dioxide as well, some of said carbon monoxide reacting with steam in said second zone to yield carbon dioxide and hydrogen,
    (e) withdrawing fuel gas from said second zone,
    (f) withdrawing coke pellets from said first fluidized bed,
    (g) withdrawing solid containing calcium sulfide and calcium carbonate from said second zone and treating at least a portion of said withdrawn solid in a calcination zone comprising a second fluidized bed operating at a temperature sufficient to decompose calcium carbonate, the heat required for the decomposition being supplied by the partial combustion of a fuel with air,
    (h) withdrawing an offgas from said calcination zone, and
    (i) withdrawing from said calcination zone a solid, at least a portion of which comprises said solid containing calcium oxide of step (c).

2. The process of claim 1 in which also said solid containing calcium oxide of step (c) contains intermingled microscopic crystallites of calcium oxide and magnesium oxide.

3. The process of claim 1 in which also
    step (e) is accomplished by allowing said fuel gas to fluidize a third zone of said first fluidized bed superposed on said second zone, being contiguous therewith and larger in cross-sectional area, and by withdrawing gas from said third zone,
    step (f) is accomplished by withdrawing coke pellets from the bottom of said first zone, and
    said withdrawing of said solid from said second zone in step (g) is accomplished by withdrawing solid from said third zone.

4. The process of claim 1 in which also a minor portion of said offgas withdrawn from said calcination zone comprises at least a major portion of said gas of step (b).

5. The process of claim 1 in which also said first and second fluidized beds operate at an elevated pressure not less than about 4 atmospheres, and including the following additional step:
    subjecting at least a portion of said solid withdrawn from said second zone in step (g) to treatment including the step of contacting calcium sulfide in said withdrawn solid with steam and carbon dioxide at substantially said elevated pressure to produce hydrogen sulfide.

6. The process of claim 5 including the following additional steps:
burning at least a major portion of said offgas from said calcination zone with air to generate hot combustion products, and
expanding said hot combustion products in an expansion turbine developing power.

7. The process of claim 6 in which also said elevated pressure is greater than about 6 atmospheres, and including the following additional steps:
burning a portion of said hydrogen sulfide with air at substantially said elevated pressure to generate a combustion product containing sulfur dioxide,
leading the remaining hydrogen sulfide together with said combustion product into a pool of water at substantially said elevated pressure and at a temperature below 320° F.,
withdrawing molten sulfur from said pool,
withdrawing an offgas from said pool, and
expanding said offgas from said pool in said expansion turbine.

8. The process of claim 1 in which also at least a major portion of said fuel of step (g) is at least a portion of said fuel gas withdrawn from said second zone in step (e).

9. The process of claim 1 in which also at least a major portion of said fuel of step (g) is a residual oil or other fluid hydrocarbonaceous fuel.

10. The process of claim 1 in which also said hydrocarbonaceous fuel is hot, dry coal selected from the group consisting of bituminous and subbituminous coals and lignites and comprising particles of sizes smaller than said coke pellets, and including the following additional steps for heating and drying said coal and cooling said pellets withdrawn from said first fluidized bed in step (f):
supplying said coke pellets withdrawn from said first fluidized bed in step (f) to a lower zone of a third fluidized bed operating at a pressure not below atmospheric and at a temperature below said temperature of said first fluidized bed and above the boiling point of water at said pressure, said lower zone of said third fluidized bed comprising said coke pellets,
supplying said coal in an unheated, wet condition to an upper zone of said third fluidized bed, said upper zone comprising said coal and being superposed on soid lower zone and contiguous therewith and larger in cross-sectional area and receiving fluidizing gas therefrom, the heat derived by the cooling of said coke pellets from said temperature of said first fluidized bed to said temperature of said third fluidized bed supplying at least a major portion of the heat needed to dry said coal and to heat said coal to said temperature of said third fluidized bed,
withdrawing coke pellets from said lower zone, and
withdrawing said hot, dry coal from said upper zone.

11. The process of claim 1 including the following additional step:
burning said coke pellets withdrawn from said first fluidized bed in step (f) with air in a fluidized bed comprising in the main particles of noncombustible matter.

12. The process of claim 11 including the following additional steps:
pumping water to a high pressure,
converting said water into steam at high temperature and high pressure,
expanding said steam in a series of expansion turbine stages developing power and exhausting steam at a terminal pressure,
withdrawing steam from said series of turbine stages at one or more pressures intermediate between said high pressure and said terminal pressure,
adding heat to said withdrawn steam, thereby raising its temperature, and returning said withdrawn steam to said series of turbine stages, said added heat being a quantity such that said steam exhausted at said terminal pressure is superheated, a major portion of said heat being added to said steam by passing at least a portion of said withdrawn steam in heat-exchange relationship with said fluidized bed comprising in the main particles of noncombustible matter,
cooling said exhausted steam by heat exchange to water, and
expanding at least a major portion of said cooled steam in a turbine developing power and exhausting at sub-atmospheric pressure to a condenser.

13. The process of claim 11 in which also said fluidized bed comprising in the main particles of noncombustible matter is at a pressure greater than 4 atmospheres, and including the following additional step:
expanding combustion products from said fluidized bed comprising in the main particles of noncombustible matter in an expansion turbine developing power.

14. The process of claim 11 in which also
said hydrocarbonaceous fuel is coal selceted from the group consisting of bituminous and subbituminous coals and lignites and comprising particles of sizes smaller than either said coke pellets or said particles of noncombustible matter,
said particles of noncombustible matter comprise pellets of ash matter of said coal, and
said fluidized bed comprising in the main said particles of noncombustible matter operates at a temperature sufficient to cause individual particles of ash matter present in said coke pellets to adhere to said pellets of ash matter as said individual particles are released from said coke pellets on account of said burning.

15. A process useful in the desulfurization of a sulfurous fuel with production of fuel products low in sulfur, comprising:
(a) charging a sulfurous hydrocarbonaceous fuel to a first zone of a fluidized bed, said first zone comprising pellets of coke at a temperautre sufficient to cause carbonization or cracking of said fuel with production of fuel gases including hydrogen and a coke product adhering to said pellets,
(b) supplying a solid containing a substance avid to receive sulfur from hydrogen sulfide to a second zone of said fluidized bed at a rate such that the amount of said substance supplied is sufficient to absorb substantially all of the sulfur contained in said fuel, said second zone being superposed on said first zone and contiguous therewith and receiving fluidizing gas therefrom and being fluidized at lower velocity, said solid comprising particles of sizes smaller than said coke pellets,
(c) effecting a commingling of said coke pellets and said solid in said second zone, said substance absorbing sulfur from said fuel gases and said coke product adhering to said pellets to produce a solid containing a reaction product of said substance and hydrogen sulfide,
(d) withdrawing fuel gas from said second zone,
(e) withdrawing coke pellets from said fluidized bed, and
(f) withdrawing said solid containing said reaction product from said second zone.

16. The process of claim 15 in which also said fluidized bed operates at an elevated pressure not less than about 4 atmospheres, said substance is calcium oxide, said reaction product is calcium sulfide, and including the following additional step:
subjecting at least a portion of said solid withdrawn from said second zone in step (f) to a treatment including the step of contacting calcium sulfide in said withdrawn solid with steam and carbon dioxide at substantially said elevated pressure to produce hydrogen sulfide.

17. The process of claim 15 in which also the fluidizing gas to said first zone of said fluidized bed comprises at least in major part the partial combustion product of a fuel with air.

18. The process of claim 15 in which also said second zone is larger in cross-sectional area than said first zone.

19. The process of claim 18 in which also
step (d) is accomplished by allowing said fuel gas to fluidize a third zone of said fluidized bed superposed on said second zone, being contiguous therewith and larger in cross-sectional area, and by withdrawing gas from said third zone,
step (e) is accomplished by withdrawing coke pellets from the bottom of said first zone, and
step (f) is accomplished by withdrawing solid from said third zone.

20. Apparatus useful in the preparation of sulfur and the desulfurization of a sulfurous fuel with production of fuel products low in sulfur, comprising:
a vessel;
lower and upper zones vertically disposed within said vessel suitable for housing lower and upper zones respectively of a fluidized bed, said upper zone being not less than about four times larger in cross-sectional area than said lower zone;
a middle region between said lower and upper zones being intermediate in cross-sectional area and suitable for housing a middle region of said fluidized bed contiguous below with said lower zone of said fluidized bed and contiguous above with said upper zone of said fluidized bed;
means for supplying fluidizing gas to the bottom of said lower zone;
means for charging a sulfurous hydrocarbonaceous fuel to said lower zone;
means for charging a solid containing calcium oxide to said middle region and upper zone, said solid having a particle size substantially smaller than 1/40 inch;
means for charging a starter bed of particles substantially larger than 1/16 inch to said lower zone;
means for commingling said solid and said particles larger than 1/16 inch in said middle region;
means for maintaining a temperature in said fluidized bed sufficient to carbonize or crack said fuel charged to said lower zone;
means for maintaining a partial pressure of hydrogen in said middle region greater than about 0.5 atmosphere;
means for withdrawing fuel gas from said upper zone;
means for withdrawing coke pellets from said lower zone; and
means for withdrawing solid containing calcium sulfide from said upper zone.

21. Apparatus of claim 20 including means for contacting at least a portion of said calcium sulfide withdrawn from said upper zone with steam and carbon dioxide at an elevated pressure to produce hydrogen sulfide.

References Cited

UNITED STATES PATENTS

| 2,348,543 | 5/1944 | Johnson | 208—226 |
| 2,364,390 | 12/1944 | Schaafsma | 208—226 |
| 2,559,631 | 7/1951 | Kalbach | 266—25 |
| 2,595,365 | 5/1952 | Odell et al. | 201—31 XR |
| 2,970,893 | 2/1961 | Viles | 23—181 |
| 3,164,958 | 1/1965 | Pacault | 60—39.18 |
| 3,194,644 | 7/1965 | Gorin et al. | 48—197 |
| 3,228,872 | 1/1966 | Metrailer | 208—127 |
| 3,325,992 | 6/1967 | Sheldon | 60—39.18 |

FOREIGN PATENTS

| 661,687 | 4/1963 | Canada. |
| 944,630 | 12/1963 | Great Britain. |
| 1,020,147 | 11/1957 | Germany. |

NORMAN YUDKOFF, Primary Examiner

DAVID EDWARDS, Assistant Examiner

U.S. Cl. X.R.

60—39.18; 201—20, 31, 5; 208—127, 226

UNITED STATES PATENT OFFICE
CERTIFICATE OF CORRECTION

Patent No. 3,481,834                                                     December 2, 1969

Arthur M. Squires

It is certified that error appears in the above identified patent and that said Letters Patent are hereby corrected as shown below:

Column 7, line 56, "enriched in a $CaCO_3$" should read -- enriched in $CaCO_3$ --. Column 8, line 22, "susbtantially" should read -- substantially --. Column 9, line 31, "stream" should reac -- steam --. Column 12, line 38, "million" should read -- millioı --; line 48, "continguous" should read -- contiguous --; line 50 "minus -100-mesh" should read -- minus-100-mesh --. Column 13, line 39, "Co" should read -- CO --. Column 20, line 35, "then is' should read -- then, is --; line 53, "enerby" should read -- energy --. Column 21, line 65, "9.23° F." should read -- 923° F. Column 22, line 59, the first semi-colon in the line should be replaced by a colon. Column 23, line 8, "896.500" should read -- 896,500 --. Column 24, line 29, "say at" should read -- say, at Column 26, line 54, "stem" should read -- steam --; line 58, "line 28" should read -- line 48 --. Column 31, line 47, "soid" should read -- said --. Column 32, line 22, "selceted" should reː -- selected --; line 40, "temperautre" should read -- temperaturᴇ --.

Signed and sealed this 27th day of October 1970.

(SEAL)
Attest:

EDWARD M. FLETCHER, JR.                               WILLIAM E. SCHUYLER, JR.
Attesting Officer                                                   Commissioner of Patents